(12) United States Patent
Dolgas et al.

(10) Patent No.: US 6,732,970 B2
(45) Date of Patent: May 11, 2004

(54) STATOR WINDING AND COIL LEAD TERMINATION METHOD AND APPARATUS

(75) Inventors: Patrick A. Dolgas, Milford, OH (US); John W. Bradfute, Xenia, OH (US); Damon E. Bussert, Springfield, OH (US); Gary E. Clemenz, Bellbrook, OH (US); Larry E. Staton, Springfield, OH (US); Arlie D. Williams, Xenia, OH (US)

(73) Assignee: Globe Products Inc., Huber Heights, OH (US)

( * ) Notice: Subject to any disclaimer, the term of this patent is extended or adjusted under 35 U.S.C. 154(b) by 0 days.

(21) Appl. No.: 09/834,042

(22) Filed: Apr. 12, 2001

(65) Prior Publication Data

US 2002/0079399 A1 Jun. 27, 2002

Related U.S. Application Data

(60) Provisional application No. 60/196,836, filed on Apr. 13, 2000.

(51) Int. Cl.[7] .................................. H02K 15/085
(52) U.S. Cl. ........................... 242/432.4; 29/596
(58) Field of Search ........................ 242/432, 432.2, 242/432.4; 29/596

(56) References Cited

U.S. PATENT DOCUMENTS

| | | | | |
|---|---|---|---|---|
| 4,074,418 A | * | 2/1978 | Pearsall ..................... 29/596 |
| 4,991,782 A | * | 2/1991 | Luciani ................... 242/432.4 |
| 5,099,568 A | | 3/1992 | Santandrea |
| 5,186,405 A | * | 2/1993 | Beakes et al. .............. 242/432 |
| 5,341,997 A | * | 8/1994 | Luciani ................... 242/432.4 |
| 5,413,403 A | * | 5/1995 | Beakes et al. ................ 294/88 |
| 5,535,503 A | | 7/1996 | Newman |
| 5,586,384 A | * | 12/1996 | Newman ..................... 29/596 |
| 5,664,317 A | * | 9/1997 | Ponzio et al. ................ 29/596 |
| 5,685,061 A | | 11/1997 | Beakes |
| 5,732,900 A | | 3/1998 | Burch |
| 5,755,021 A | * | 5/1998 | Beakes et al. ................ 29/596 |
| 5,833,166 A | * | 11/1998 | Newman .................. 242/432.4 |
| 5,946,792 A | * | 9/1999 | Beakes ........................ 29/596 |
| 5,950,300 A | * | 9/1999 | Newman ..................... 29/596 |
| 5,964,429 A | | 10/1999 | Burch et al. |
| 6,108,897 A | * | 8/2000 | Beakes et al. ................ 29/596 |
| 6,267,317 B1 | * | 7/2001 | Beakes et al. ........... 242/432.4 |
| 6,325,318 B1 | * | 12/2001 | Stratico et al. .......... 242/433.4 |

FOREIGN PATENT DOCUMENTS

| | | | | |
|---|---|---|---|---|
| GB | 2068787 | * | 8/1981 | .............. 242/432.2 |
| JP | 2-214445 | | 8/1990 | |
| WO | WO 01/80406 A1 | | 10/2001 | |

OTHER PUBLICATIONS

Reference AR is submitted to apprize the examiner of an inventorship matter explained in the accompanying Information Disclosure Statement.

Two sheets of drawings, EL69165, sheet 3 of 4 and EL69165, sheet 4 of 4, produced by The Globe Tool & Engineering Company of Dayton, Ohio, during 1976 and showing parts of a stator winder admitted to be prior art. See the accompanying Information Disclosure Statement.

\* cited by examiner

*Primary Examiner*—Emmanuel Marcelo
(74) *Attorney, Agent, or Firm*—Roger S. Dybvig

(57) ABSTRACT

The reciprocating and oscillating winding spindle of a stator winding machine is rotatable through 180° to enable a stator winding and lead terminating method and apparatus for automatically winding a 2-pole stator having two pole pieces each with a coil wire wound from the same, single strand of wire. A cross-over wire segment between the two stator coils extends through the bore of the stator and is trapped against an inside wall of the stator by a cross-over wire retaining member. A stator coil lead terminating apparatus is capable of complex manipulations of stator coil lead wires at a winding station. Stator coil lead wires can be looped about wire guide posts on a stator core in the course of forming coil lead terminations, and the posts can be protected against bending or breaking by looping pins that partly receive the posts.

31 Claims, 25 Drawing Sheets

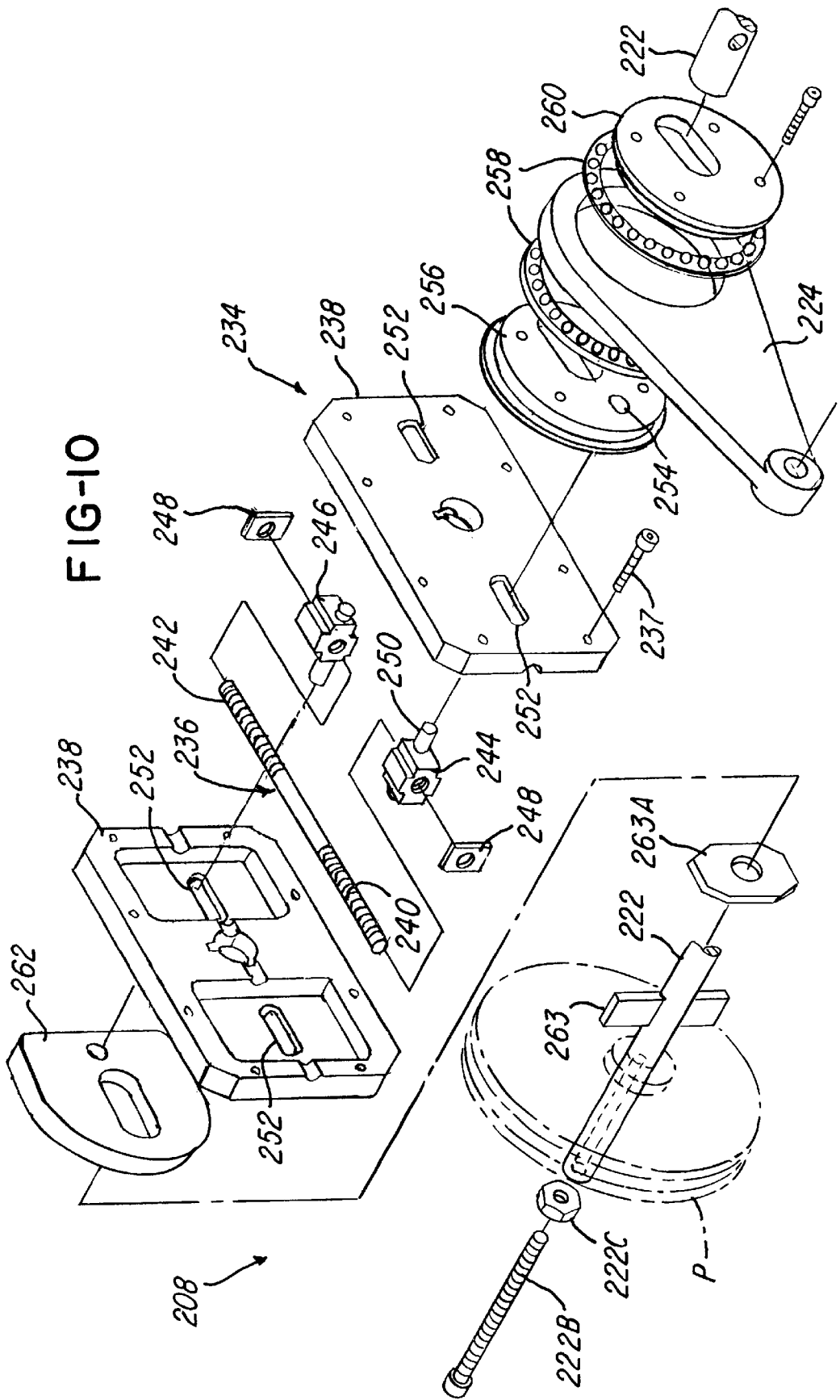

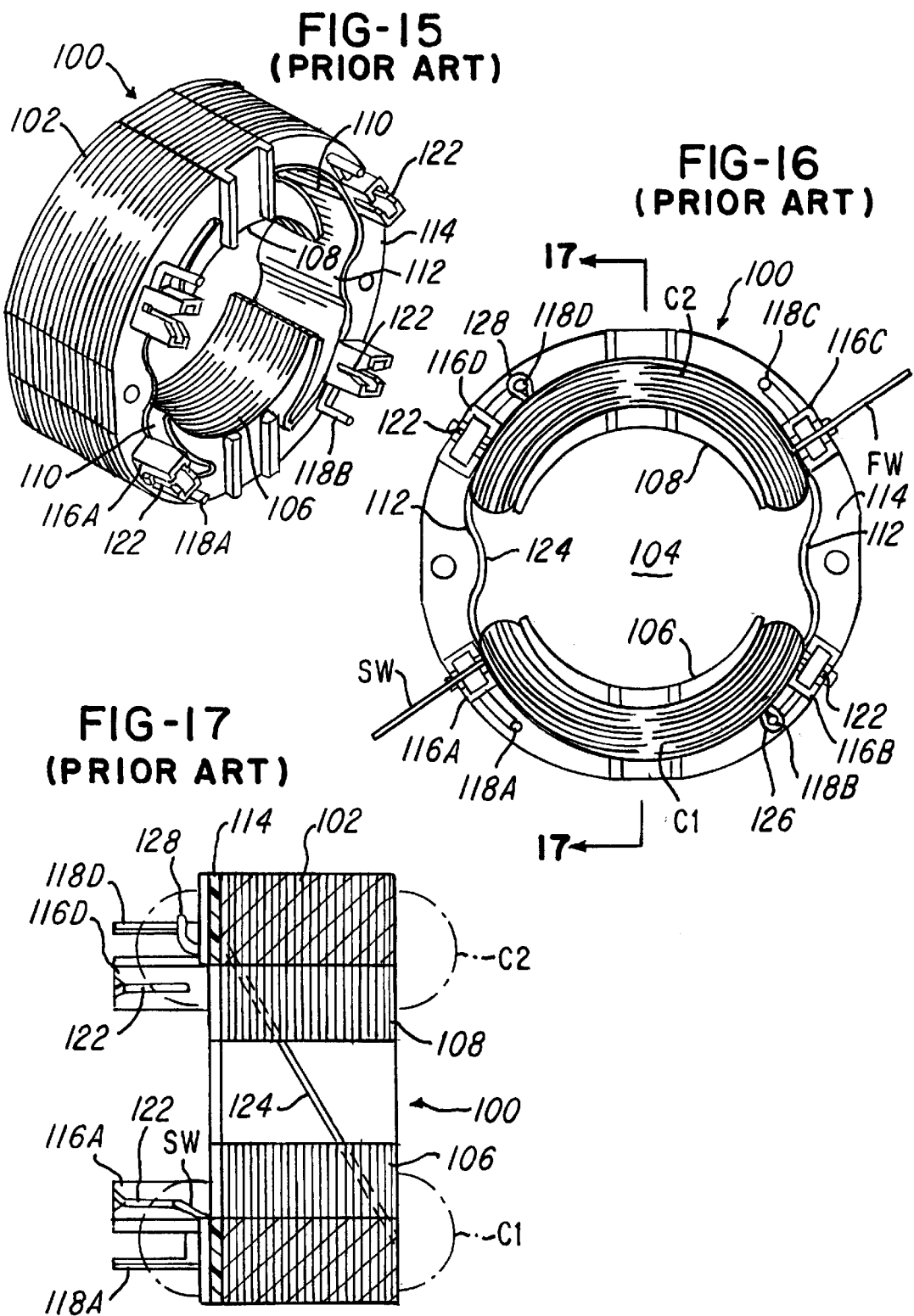

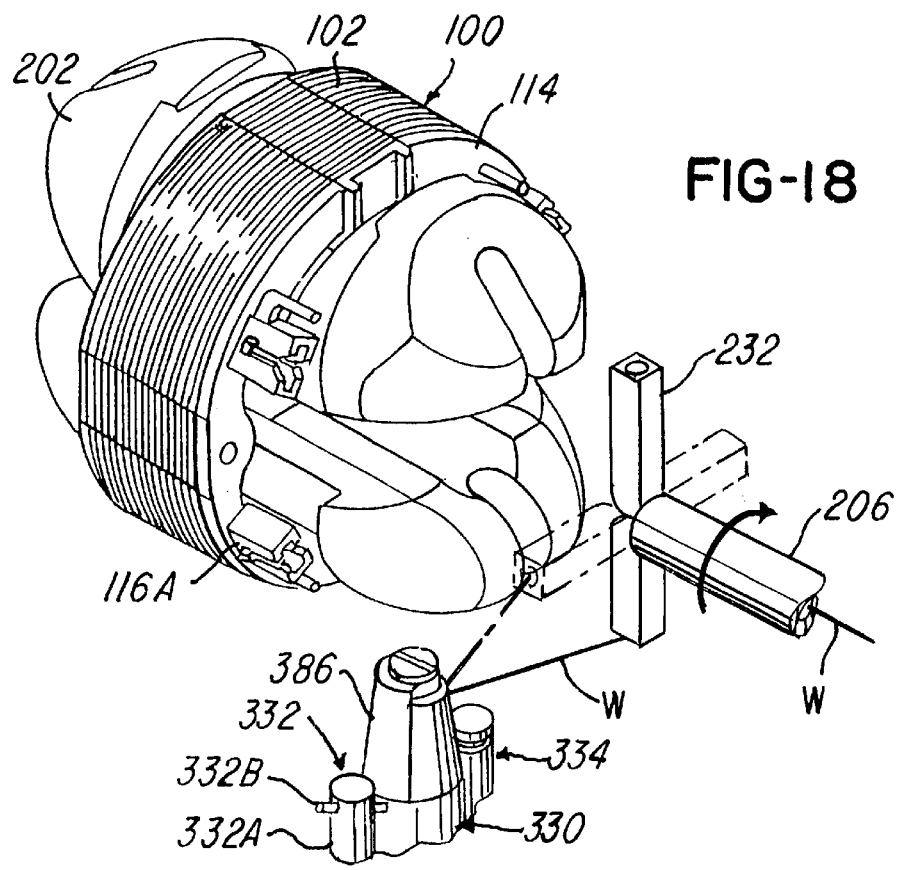
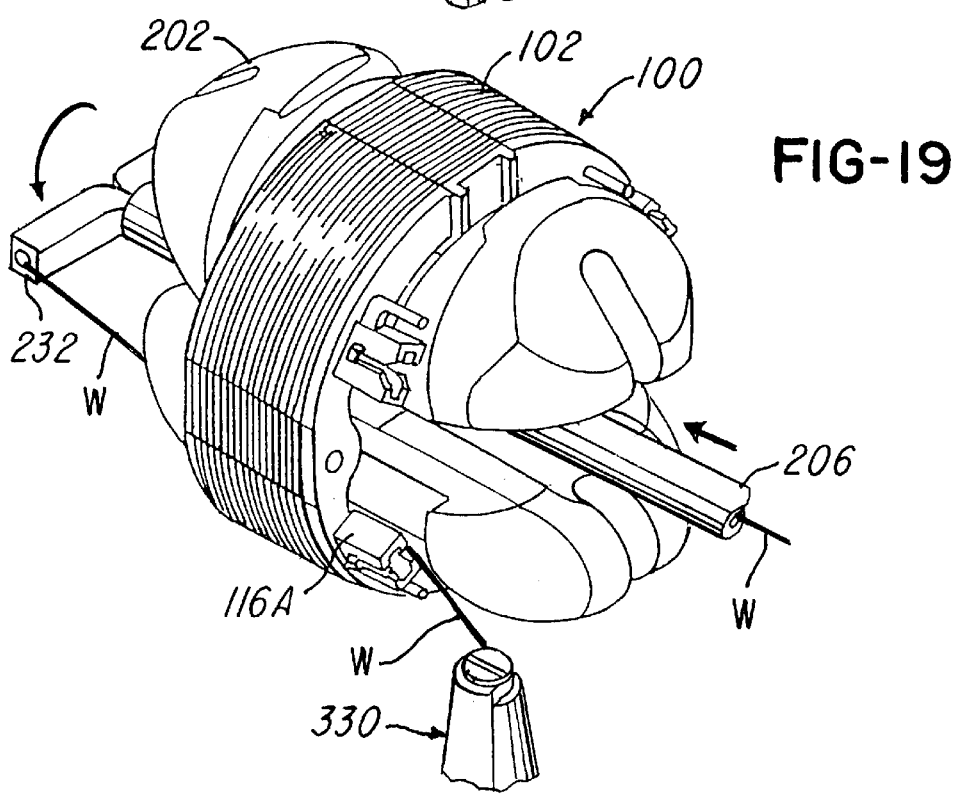

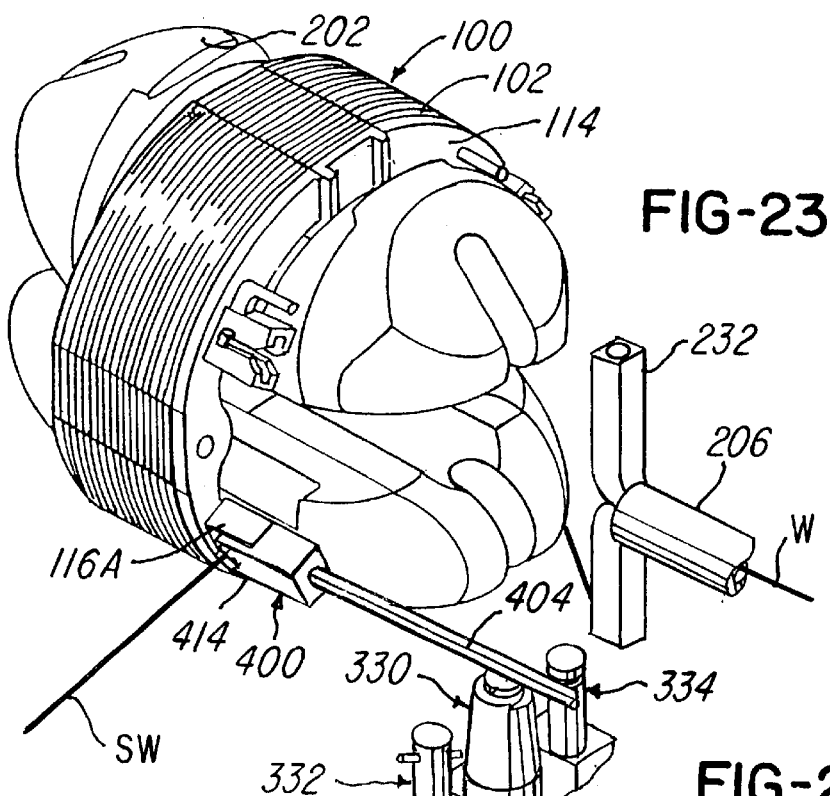
FIG-23
FIG-24
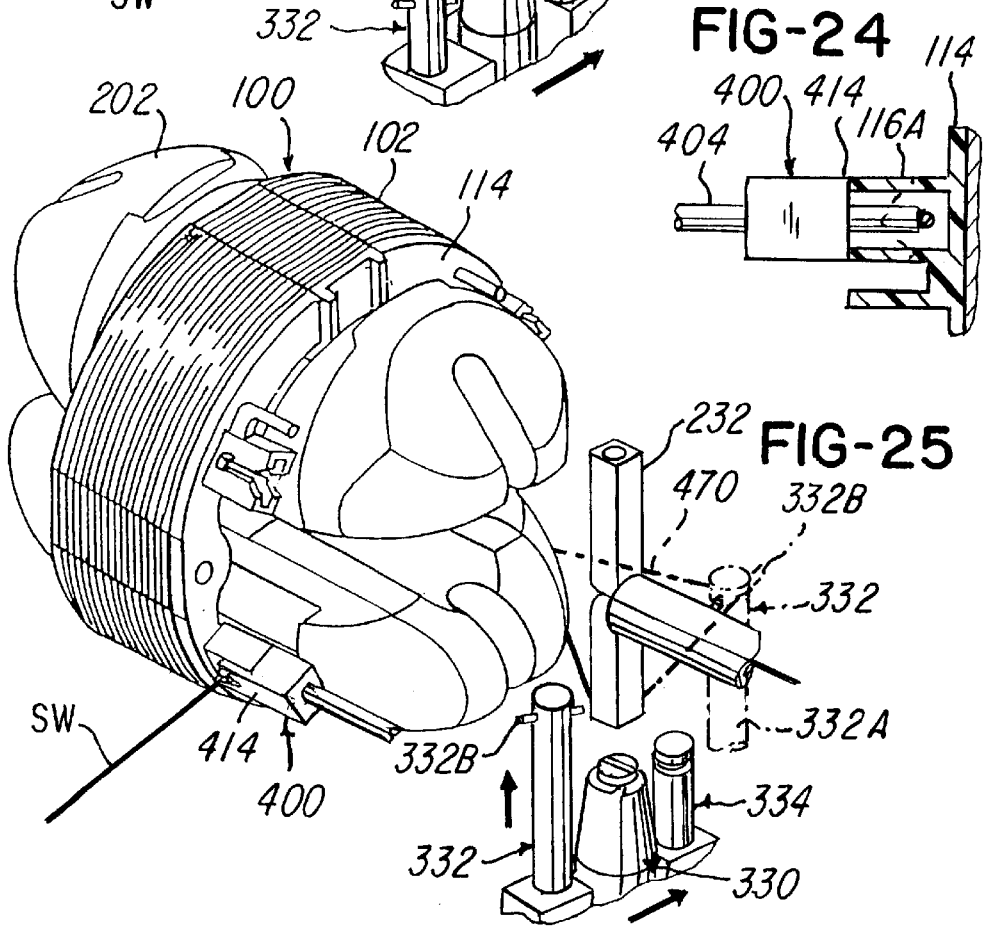
FIG-25

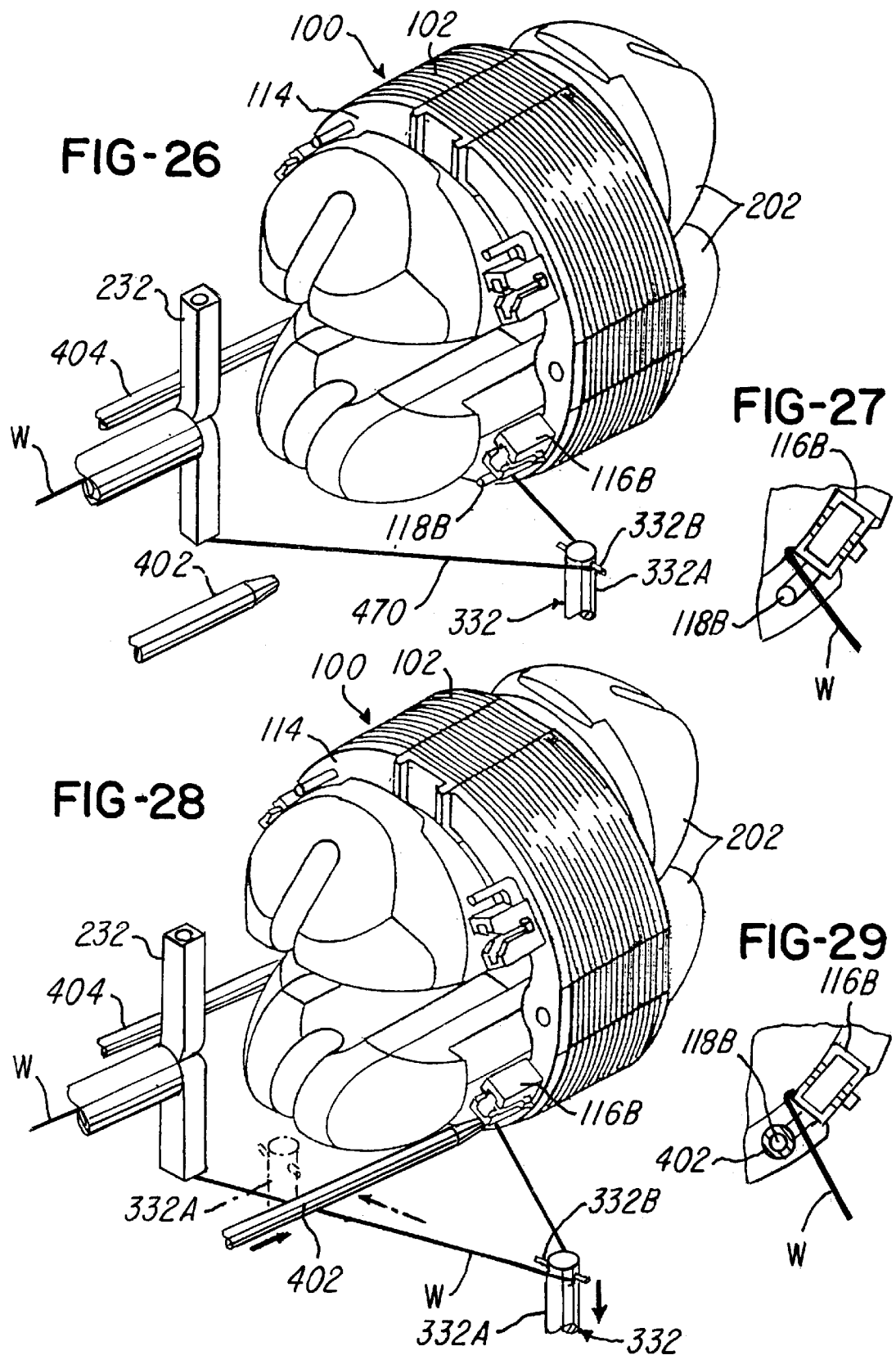

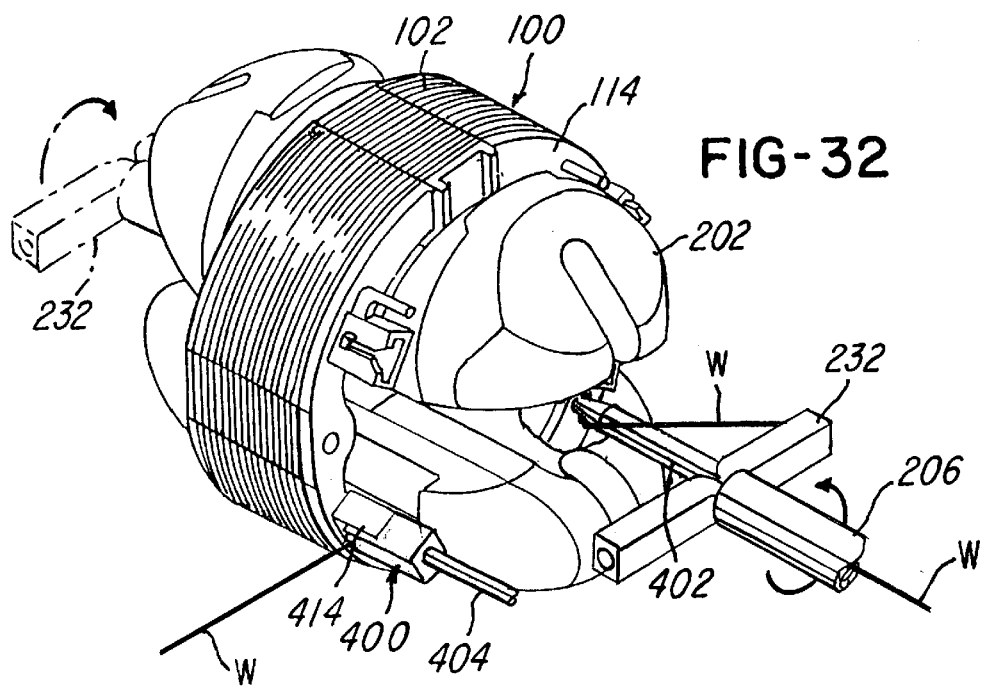
FIG-32
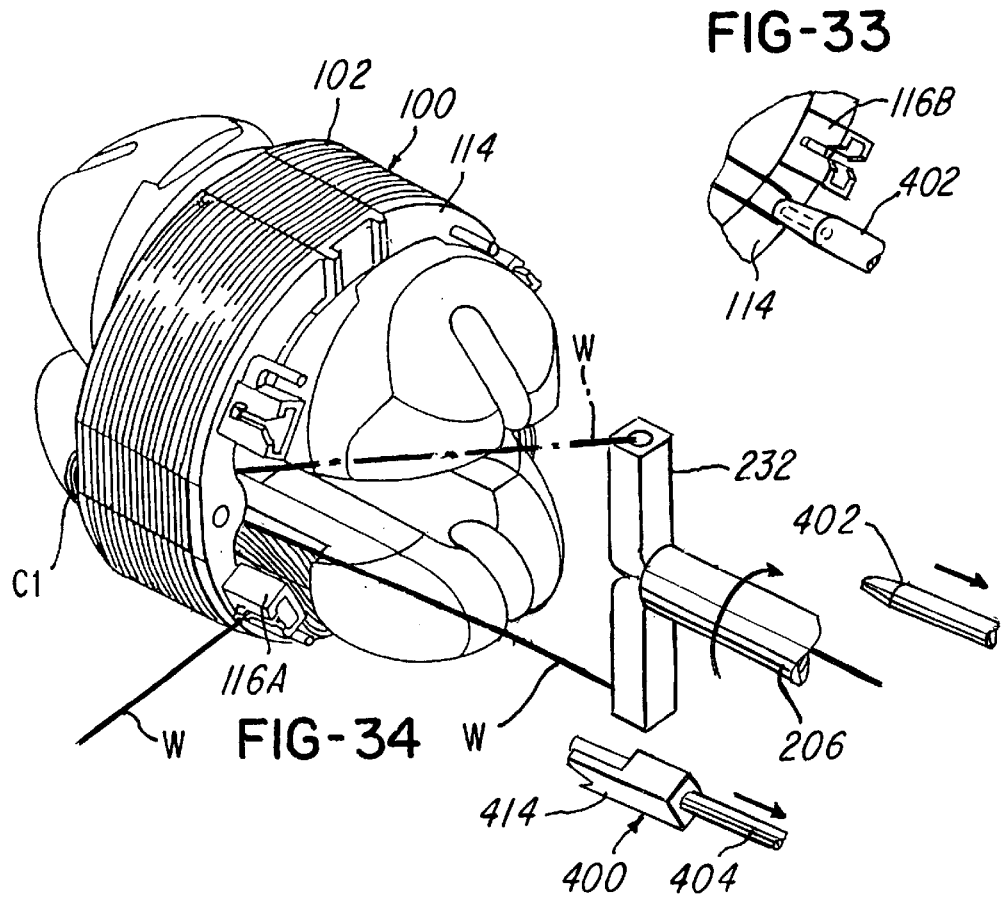
FIG-33
FIG-34

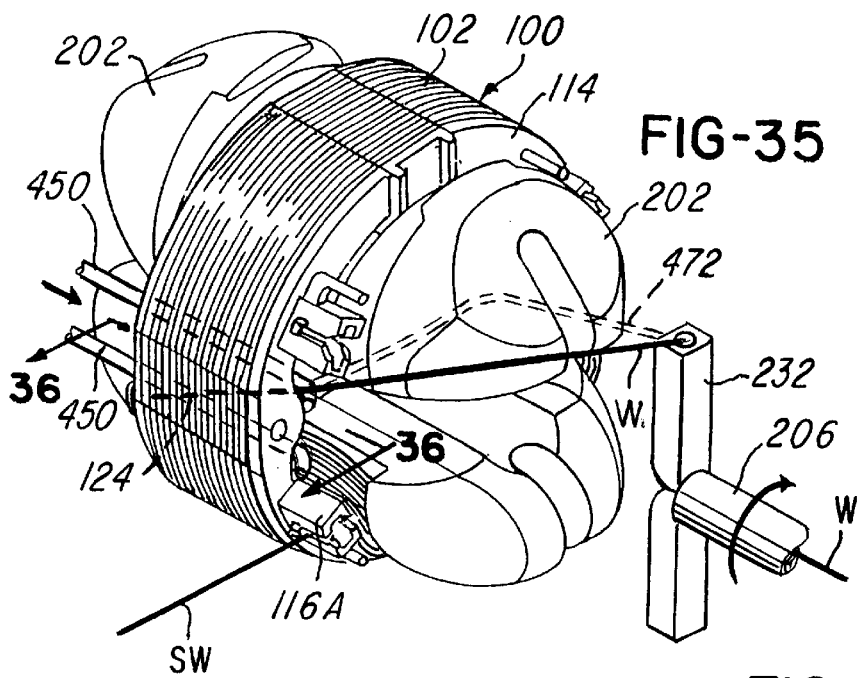
FIG-35
FIG-36
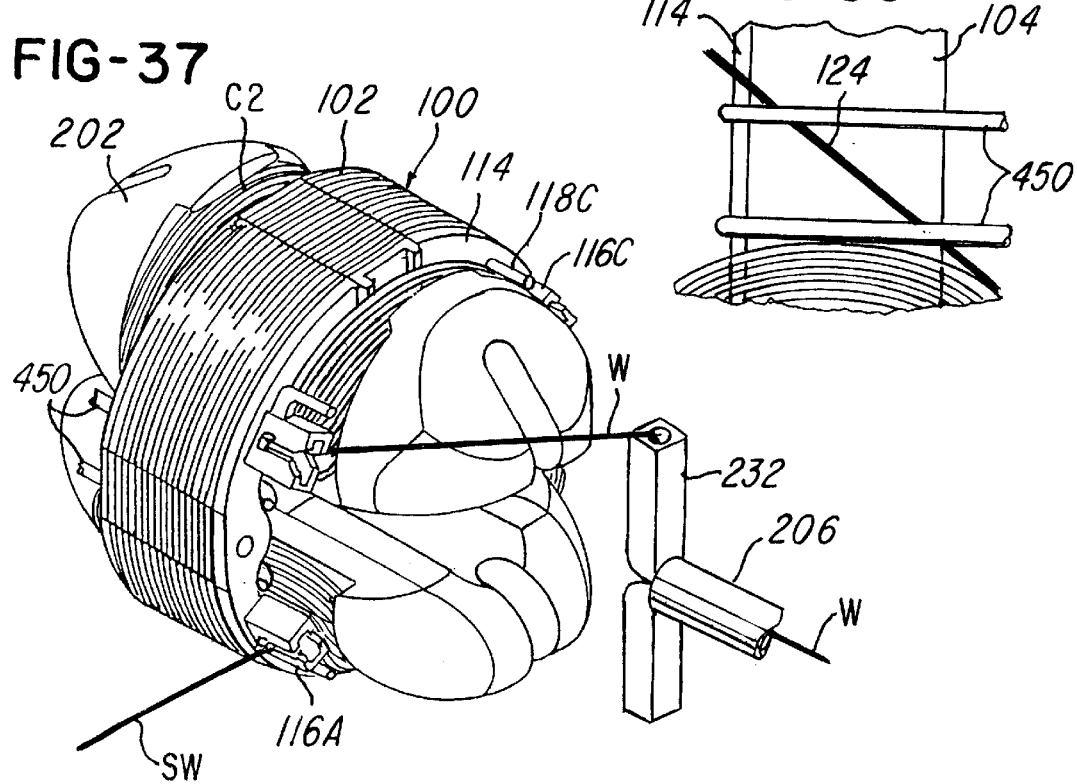
FIG-37

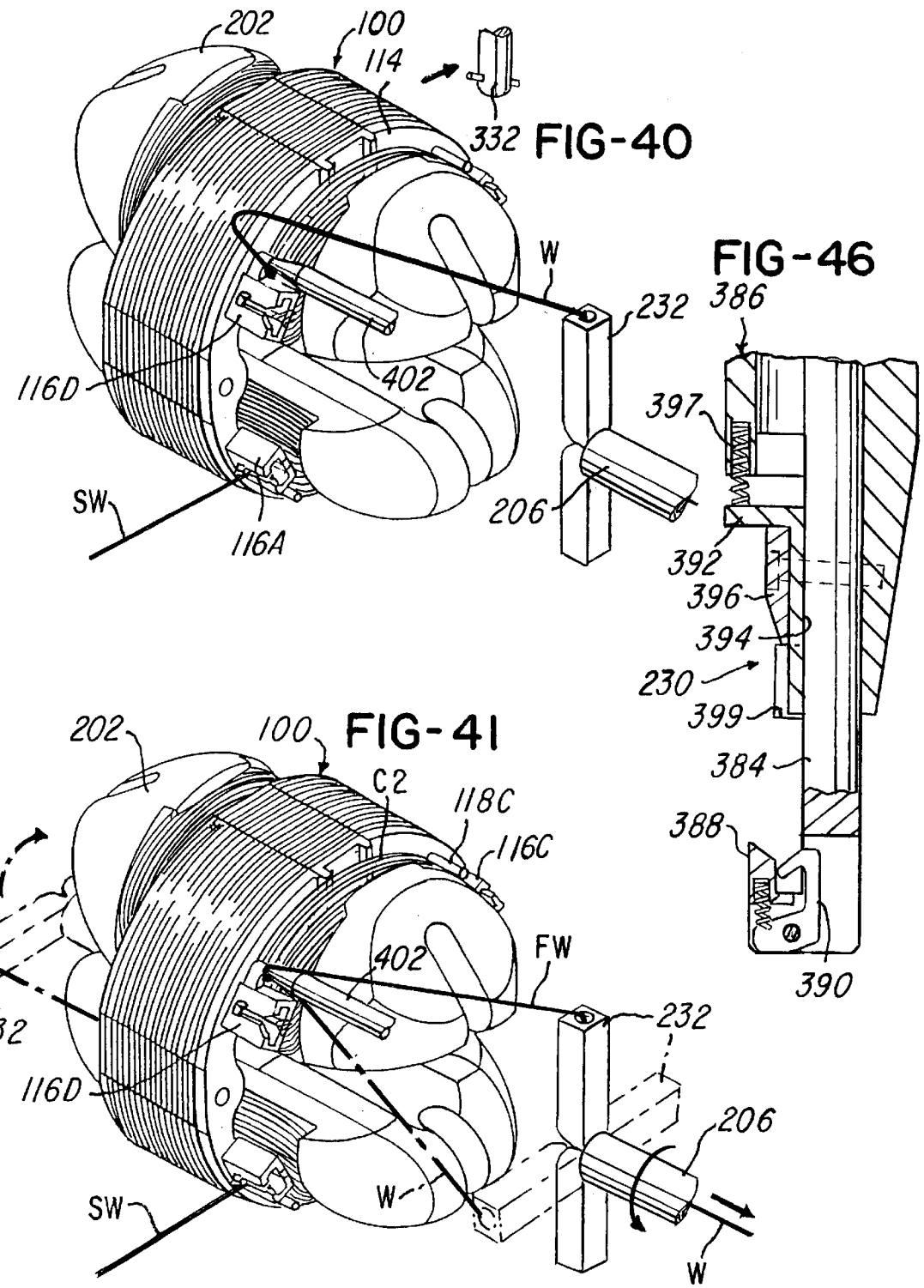

STATOR WINDING AND COIL LEAD TERMINATION METHOD AND APPARATUS

CROSS REFERENCE TO RELATED APPLICATIONS

This application claims the benefit of U.S. Provisional Application No. 60/196,836, filed Apr. 13, 2000.

FIELD OF THE INVENTION

This invention relates to a stator winding and coil lead termination method and apparatus. The invention is intended primarily for use in the manufacture of 2-pole stators for dynamoelectric machines, such as motors, but may have application to the manufacture of other devices.

INCORPORATION BY REFERENCE

The disclosures of the following patents are hereby incorporated by reference herein.
1. U.S. Pat. No. 4,074,418 to Pearsall
2. U.S. Pat. No. 5,186,405 to Beakes et al.
3. U.S. Pat. No. 5,586,384 to Newman
4. U.S. Pat. No. 5,413,403 to Beakes et al.

BACKGROUND OF THE INVENTION

Many electric motor stators are configured to include a non-conductive terminal board mounted to an end face of the stator core, which terminal board carries electrically conductive terminals to which start and finish leads of the electric field coils wound onto the core are attached. Such stators are particularly suited for fully automated production because the electric field coils may be machine wound onto such stator cores and the start and finish leads of each coil may be at least temporarily secured to the terminal boards or terminals mounted thereon before the wound stator is removed from the winding machine for further processing. The coils will not unwind or despool upon removal of the stator from the winding machine because the finish leads are each secured to the terminal board or a terminal thereon. The start leads and tap leads, as is well known, are each trapped by their respective coil turns and may, in addition, be connected to the terminal board or terminals thereon. Tap wire leads may also be trapped by the coil turns and may be connected to the terminal board or terminals thereon.

This invention is directed to a method and apparatus for manufacturing stators with such terminal boards.

The above listed Pearsall U.S. Pat. No. 4,074,418 shows apparatus for inserting stator coil lead wires into terminal boxes on a stator core while the stator is in the winding station. Pearsall provides wire guide members that are aligned with slots in the terminal boxes and lead pull, cut and hold assemblies which align the stator coil leads with slots in the terminal boxes, and a lead wire insertion assembly movable along the axis of the stator winding ram or spindle. The lead pull, cut and hold assemblies include wire grippers which are limited to movements in horizontal and vertical directions. The insertion assembly has two pairs of wire insertion fingers having notched ends that are moved to positions outside the terminal boxes. When so moved, the notched ends of the insertion fingers engage the coil lead wires and force them into the slots in the terminal boxes. This construction enables the connection of the coil lead wires to the terminal members on the stator and avoids the need to connect the lead wires to temporary winding clamps at the winding station.

Beakes et al. U.S. Pat. No. 5,186,405 shows a turret stator winder including mechanisms useful in the practice of the instant invention. These include a stator winding head 92 with a shuttle or ram 94 and a programmably-operable lead pull assembly 208 that includes wire grippers 84. These also include pairs of winding forms 80 and 82, winding form retainer blades 130 and 132, and mechanisms for moving the winding forms toward and away from a stator located at the winding station. The wire grippers 84 are movable in both vertical and horizontal directions, as are the wire grippers shown in the Pearsall '418 patent. Moreover, the lead pulls of the Beakes et al. '405 patent includes mechanism for pivoting the wire grippers 84 toward and away from the plane of the end face of a stator at the winding station.

It is also known in the prior art to utilize wire guides and a lead pull assembly having pivotal wire grippers as shown in the Beakes et al. '405 patent to place lead wires into the slots of terminal boxes without the use of insertion fingers.

The present invention could be used with a turret stator winder as shown in the Beakes et al. '405 patent. The invention could also be used in connection with an in-line stator winder in which stators move along tracks to and from the winding station. The Newman U.S. Pat. No. 5,586,384 is incorporated herein to show a representative in-line winder with which this invention could be used.

Turret stator winders and in-line stator winders may include mechanisms to automatically place stators at a winding station. This invention is also usable with stator winding machines which do not have associated stator handling mechanisms and in which stators to be wound are manually placed in a suitable clamp in the winding machine.

Both the Beakes et al. '405 patent and the Newman '384 patent show winding machines that include a winding station at which the coil lead wires are connected to temporary wire clamps which are separate from the stator being wound. The stators and the temporary clamps are moved with the stator to a robotic lead connect station at which the lead wires are removed from the temporary clamps and at least temporarily connected to the terminal members on the stator.

Beakes et al. U.S. Pat. No. 5,413,403 shows a lead pull assembly or wire gripper having upper and lower clamping jaws 36 and 26, respectively, and a fitting having a sharpened edge for severing a gripped wire segment.

Recent developments in stator technology have resulted in demands for stator winding methods which cannot be met by known stator winding machines. In particular, each coil of a conventional 2-pole stator has a running winding pattern that includes two coils wound about separate pole pieces from two separate strands of wire. Each coil has a start wire and a finish wire connected to separate terminal members and both coils are usually wound at the same time from two different strands of wire. A recent requirement is for stators in which both running coils are wound from a single strand of wire, with a first coil wound in one direction on one pole piece and a second coil wound in the opposite direction on the other pole piece. Such a winding pattern reduces the number of start and finish wire terminals from four to two. This can result in a substantial savings in manufacturing cost because of the reduction in the number of terminal connections that must be dealt with. There are no prior machines known that are capable of winding and terminating such stators entirely automatically. Also, some stators have wire guide posts about which parts of stator coil lead wires must be looped because of certain winding pattern characteristics. Robotics machines capable of looping coil lead wires about such posts are known, but such machines require a lead wire connecting station which is separate from the winding station.

Definitions

The following terms, in both plural and singular forms, used in the specification and claims are used in the senses indicated below, unless a different meaning is clear from the context in which the terms are used.

"Actuator" refers to actuators comprising a cylinder, a piston and a piston rod, which are usually air operated but could be hydraulically operated.

"Lead pull" is used as a shortened expression for lead pull, cut and hold. Thus, a "lead pull assembly" as used herein denotes a lead pull, cut and hold assembly. The term "lead pulls" also denotes a lead pull, cut and hold assembly.

The terms "upper," "lower," "vertical" and "horizontal" are used in a relative sense and not in an absolute sense. The term "front" in reference to the winding machine or the stator is used to refer to the parts of the machine and stator facing an observer standing in front of the winding shuttle during a winding operation. Accordingly, the term "rear" is used in the opposite sense. Thus, for example, at the outset of a winding operation, the winding shuttle moves from behind the rear end of the stator to the front end of the stator to extend the start wire through the bore of the stator.

A "start wire" is the segment of a magnet wire extending from a lead pull gripper through the bore of the stator to form the first side of a stator coil. The wire segments that extend across the front and rear of a stator pole piece are referred to as the "end turns." Because the first end turn merges with and extends from the start wire, the transitional wire segment at the front end of the start wire and the beginning of the first end turn are indistinguishable and is considered to be part of the start wire or part of the first end turn. Some stators, as will be further discussed below, have posts around which start or finish wires are looped. During the winding and lead termination process, these stators typically have wire segments which extend from a wire gripper around the forward end of a pole piece in a direction opposite to the direction in which the coil is to be wound. Any wire segment between a wire gripper and a coil that extends at the beginning of a winding sequence in a direction around a pole piece which is opposite to the direction in which the coil is wound is considered to be part of the start wire.

A "finish wire" is the segment of a magnet wire extending from the last turn of a stator coil to a wire gripper. Because the last end turn merges with and extends to the finish wire, the transitional wire segment at the ending of the last end turn to the finish wire is indistinguishable from the finish wire and is considered to be part of the finish wire or part of the last end turn. Any wire segment that extends at the end of a winding sequence from a coil to a wire gripper that extends in a direction around a pole piece which is opposite to the direction in which the coil was wound is considered to be part of the finish wire.

"Lead wire" is either a start wire or a finish wire.

"Terminal member" is used to refer to either conductive terminals or to terminal support members, which are typically non-conductive, such as terminal sockets.

SUMMARY OF THE INVENTION

An object of this invention is to provide an improved stator winding and lead terminating method and apparatus which is capable of automatically winding 2-pole stators having two pole pieces with coils of wire wound from a single strand of wire about both pole pieces.

Another object of this invention is to provide a method and apparatus for trapping cross-over wire segments between stator coils wound from a single strand of wire on two pole pieces of a stator so that the cross-over wire segments are trapped against an inside wall of the stator.

Another object of this invention is to provide an improved stator coil lead terminating method and apparatus which is capable of complex manipulations of stator coil lead wires at a winding station.

Still another object of this invention is to provide a method and apparatus for automatically looping stator coil lead wires about wire guide posts on a stator core in the course of forming coil lead terminations.

Another object of this invention is to provide an improved stator lead pull method and apparatus.

Another object of this invention is to provide an improved rotary to reciprocating and oscillating motion transmitting method and apparatus for a stator winding machine.

Other objects and advantages will become apparent from the following description and the drawings.

BRIEF DESCRIPTION OF THE DRAWINGS

FIG. 10 is a fragmentary, exploded perspective view of another portion of the drive mechanism of FIG. 9.

FIG. 15 is a perspective view of a representative prior art unwound stator which may be wound in accordance with this invention.

FIG. 16 is a perspective view of the prior art stator of FIG. 15 after being wound in accordance with this invention to have the run coil winding of FIG. 13.

FIG. 17 is a cross-section view of the prior art wound stator taken on line 17—17 of FIG. 16, but showing the stator coils by phantom lines to avoid obscuring some of the parts of the stator.

FIGS. 18 through 45 illustrate an operating sequence that may be used in the practice of this invention to produce the wound stator of FIGS. 16 and 17. Of this group, FIGS. 18 to 21, 23, 25, 26, 28, 30 to 32, 34, 35, and 37 through 45 are perspective views of the stator at various stages of manufacture and include fragmentary perspective views of wire winding and wire handling instrumentalities used in the practice of this invention; and FIGS. 22, 24, 27, 29, 33 and 36 are fragmentary views, some enlarged, and some with parts in cross section or parts broken away.

FIG. 46 is a greatly enlarged, fragmentary cross-sectional view of a lead pull mechanism forming part of the apparatus of this invention.

DETAILED DESCRIPTION

Stators and Stator Winding Patterns

Figure 1:
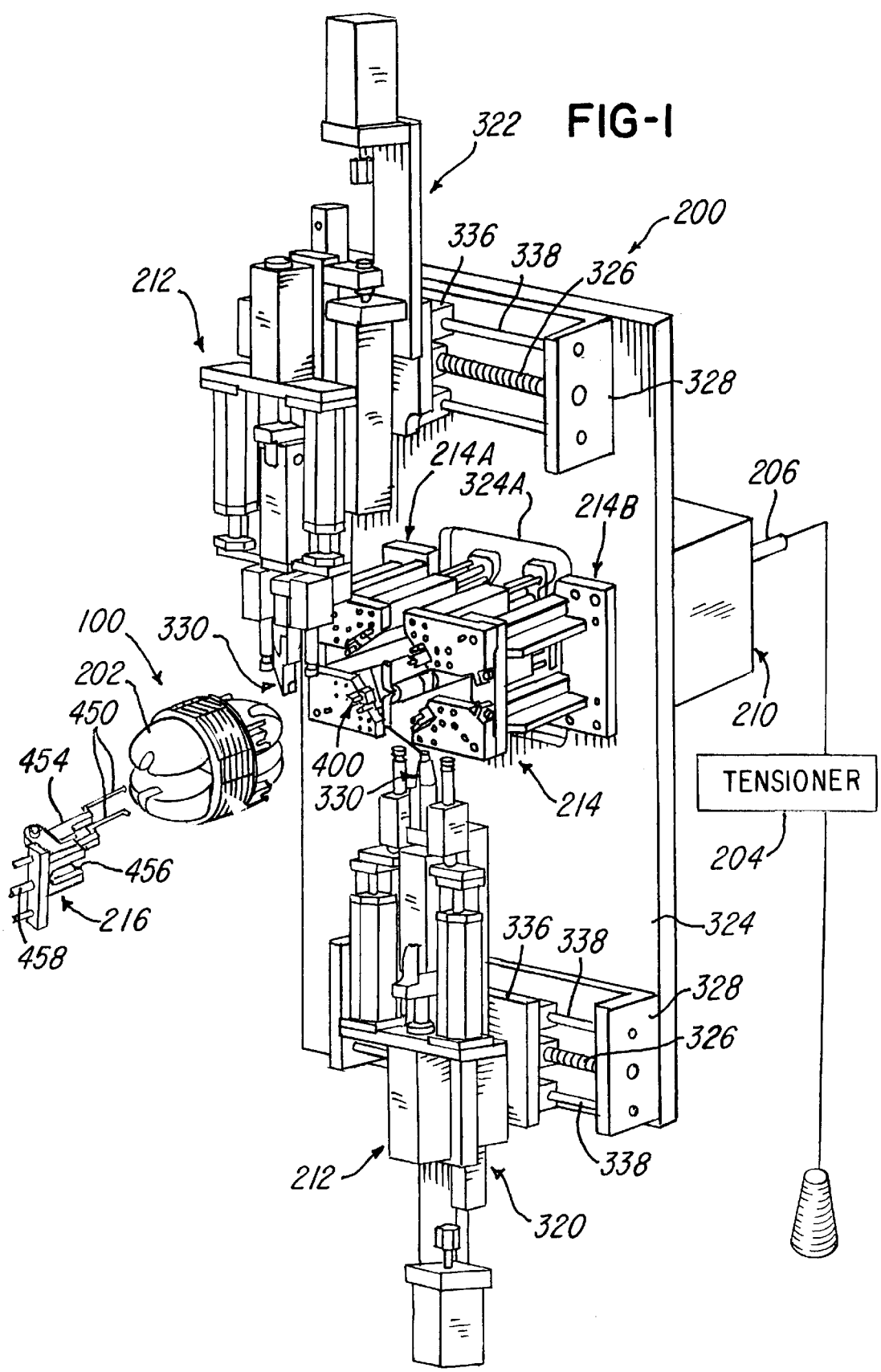
FIG. 1 is a fragmentary, partly diagrammatic, perspective view of a portion of a stator winding machine in accordance with this invention, as viewed generally from the front and right side thereof, and a stator with winding forms connected thereto.

Referring to FIGS. 15 through 17, this invention is illustrated herein for winding a 2-pole electric motor stator 100 comprising a laminated iron core 102 formed to include a central, armature-receiving bore 104 and a pair of diametrically opposed pole pieces, namely a first, lower pole piece 106 and a second, upper pole piece 108. The pole pieces 106 and 108 are bounded by stator coil-receiving slots 110 in which are located insulating linings 112 known as "cell papers." Stator coils C1 and C2 are wound into the coil-receiving slots 110.

A so-called "end fiber" or plastic terminal board 114 is located at one end of the stack of iron laminations that form the laminated core 102. The end of the stator 100 which has the terminal board 114 is, for purposes of this description, considered to be the rear of the stator, this being the end of the stator farthest from an observer standing in front of the winding machine. The opposite end, which faces the observer, is considered to be the front of the stator. The illustrated terminal board 114 has four plastic terminal boxes 116 formed thereon and separately identified by reference numbers 116A, 116B, 116C and 116D and additionally has four wire-guiding posts 118, which are respectively adjacent the terminal members 116, and are separately identified by reference numbers 118A, 118B, 118C and 118D. Each terminal box 116 has spaced walls having lead wire-retaining slots 122 in which stator coil lead wires, namely start wires SW and finish wires FW, can be inserted during the stator winding and lead termination operations. As well known in the industry, metal terminals (not shown) are inserted into the terminal boxes 116 at a later stage in the manufacture of the armature to form terminal connections to the stator coils C1 and C2.

The wound stator 100 illustrated in FIGS. 16 and 17 has a single start wire SW and a single finish wire FW. In addition, a cross-over wire segment 124 extends on the inside of the stator core 102 from the end of the coil C1 to the beginning of the coil C2.

Figure 13:
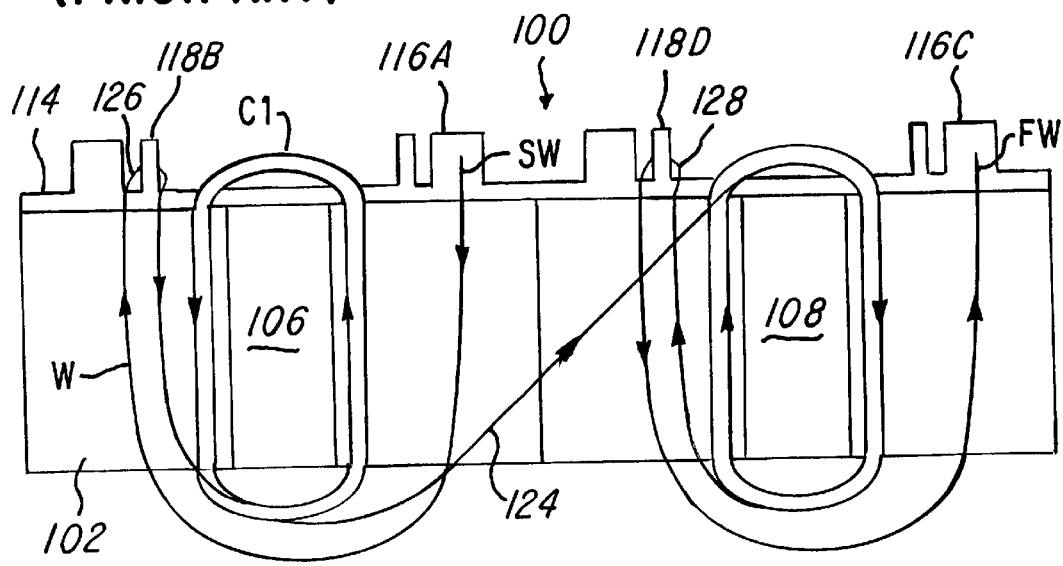
FIG. 13 is a representative prior art stator winding and lead termination diagram of the run coils of a dynamically braked field winding of a stator that may be produced in accordance with this invention.

The winding pattern which produces this construction of the stator 100 as described above is a main or running winding, which is more fully illustrated in FIG. 13. In FIG. 13, the inside of the stator 100 (shown highly simplified) is represented as if laid flat. The arrows illustrate the winding directions. This present invention is not concerned with the direction of current flow or the external electrical connections to the lead wires SW and FW to produce operative stators, which are not illustrated or described herein.

As evident from an inspection of FIG. 13, the coil C1 is wound beginning with the placement of the start wire SW across the terminal box 116A, continues with the start wire SW being extended through the bore of the stator, around the rear end of the lower pole piece 106, back through the bore of the stator, and around the wire guiding post 118B to form a wire loop 126 therearound, after which numerous turns of wire W are wound around the lower pole piece 106 to produce the coil C1. At the completion of the winding of the coil C1, the wire W is extended along the inside surface of the stator bore 104 to produce the cross-over wire segment 124, which extends over the rear end of the upper pole piece 108 whereupon the coil C2 is then wound in a direction opposite to the direction in which the coil C1 is wound. At the end of the winding of the second coil C2, the wire W is coursed around the wire-guiding post 118D to form a wire loop 128 therearound in order to reverse the direction of the wire, then coursed around the rear end of the pole piece 108 and extended forwardly to form the finish wire FW that is inserted into the finish wire terminal box 116C. As those familiar with the art will be aware, the winding pattern of FIGS. 13, 16 and 17 entails the technically difficult problem of winding two coils from a single strand of wire around oppositely located pole pieces.

Figure 14:
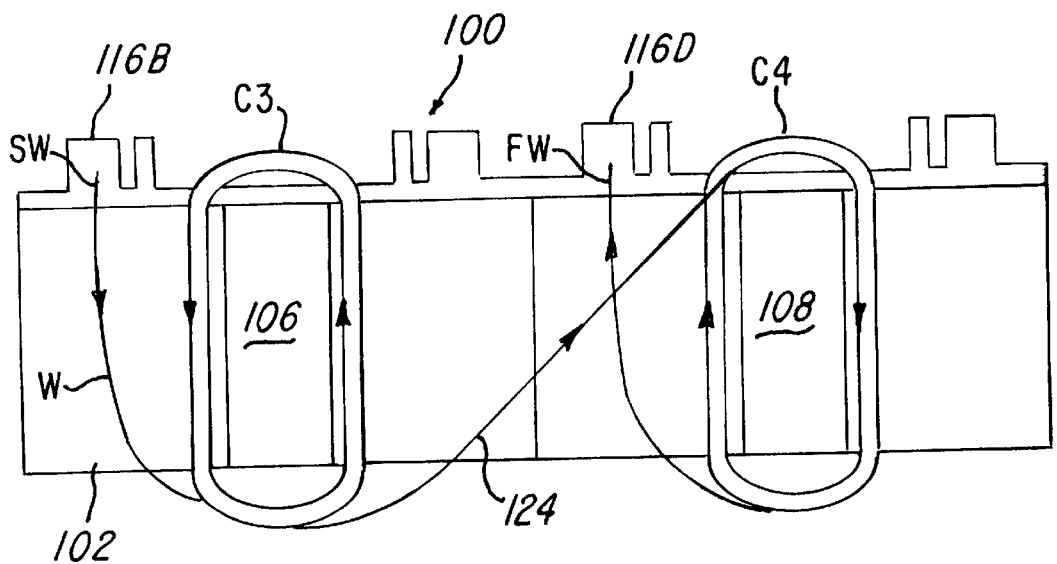
FIG. 14 is a stator winding and lead termination diagram of prior art brake coils which may be wound on the same stator as the run coils of FIG. 13.

FIG. 14 is a winding diagram of a brake coil winding pattern that includes brake coils C3 and C4 which are wound around the pole pieces 106 and 108 either under or over the running coils C1 and C2. It will be noted that the brake coil winding pattern also includes a cross-over wire segment, designated 124, located against the inside wall of the stator, and also involves the same problem of winding two coils around oppositely located pole pieces, the two coils being formed from a single strand of wire.

Figure 11:
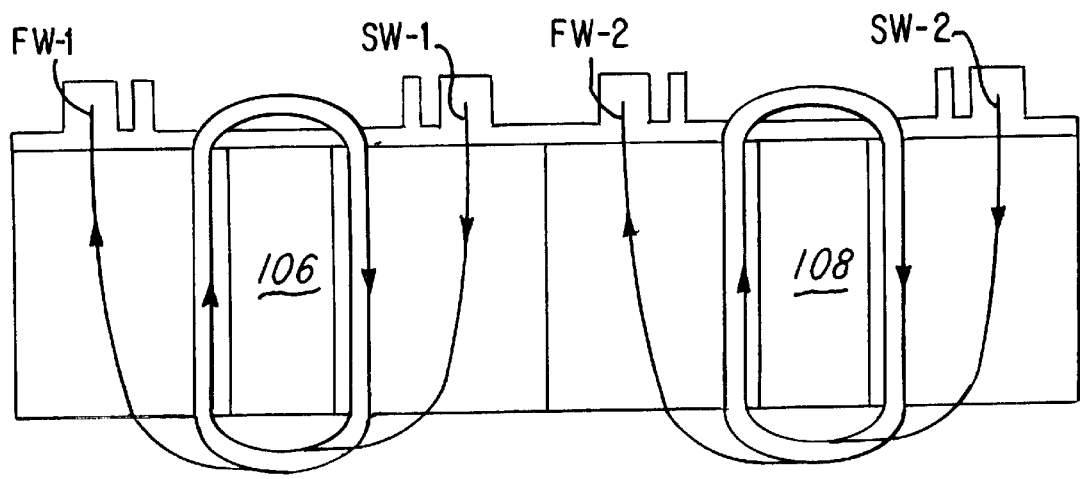
FIGS. 11 and 12 are representative prior art stator winding and lead termination diagrams of wound stators which may be produced in accordance with this invention. The arrows shown in FIGS. 11 and 12 depict the winding directions and not the direction of the current passing through the windings.
Figure 12:
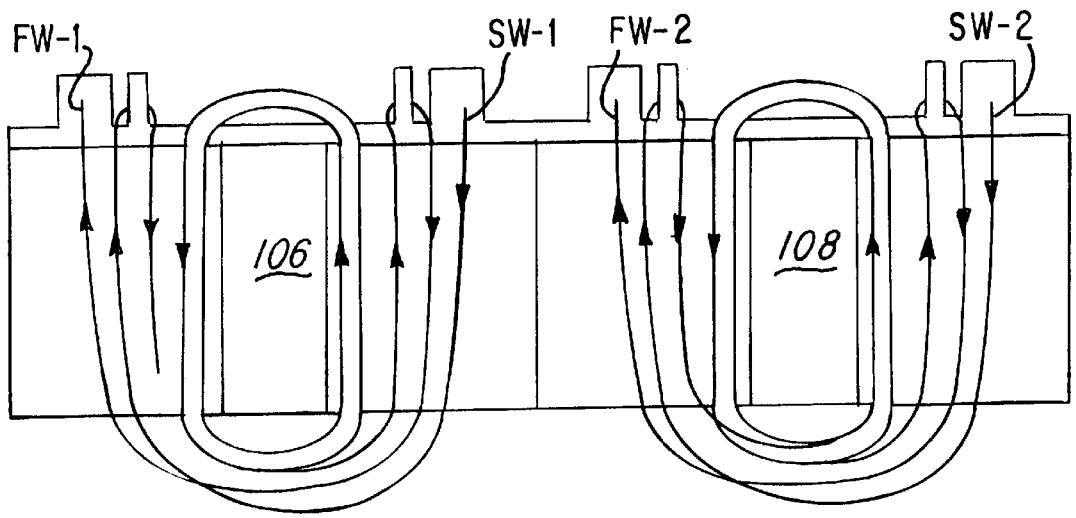

The coil winding patterns of FIGS. 13 and 14 provide the benefit that there is only one start wire and only one finish wire for each pair of coils. FIGS. 11 and 12 show more typical winding patterns in which each of the two coils has a start wire and a finish wire, labelled respectively as SW-1, SW-2, FW-1 and FW-2. The winding pattern of FIG. 11 is known as a "forward" winding pattern; the pattern of FIG. 12 is known as a "reverse" winding pattern.

This invention is directed to a method and apparatus by which stators having various different winding patterns, including those illustrated in FIGS. 11 through 14, may be automatically produced using the same winding machine. (Of course, it may be more efficient to produce the running winding of FIG. 13 on one winding machine and produce the brake winding of FIG. 14 on a second, similarly constructed, winding machine.) In order automatically to produce the winding patterns of FIGS. 13 and 14, it is necessary not only to provide a stator winding machine having a winding spindle or ram which can be automatically capable of winding a coil of wire around a first pole piece and thereafter a coil of wire about a diametrically spaced pole piece. Furthermore, it is necessary to provide wire handling tooling capable of manipulating the wire to place the lead wires in the terminal boxes 116 and to form the wire loops around the wire guiding posts 118 regardless of the winding direction or the location of the pole piece on which a coil being formed will be formed or has been formed.

Stator Winding Station

Referring to FIG. 1, this invention is illustrated in connection with a stator winding machine, generally designated 200, which has a winding station that includes a support (not shown) for a stator 100 to which temporary wire winding forms 202 have been clamped, as is well known in the art. One or more strands of magnet wires taken from one or more supply spools and coursed through wire tensioners 204 extend through a winding ram or spindle 206 and are wound into coils on the stator by reciprocating and oscillating movements of the spindle 206 caused by a rotary to reciprocatory and oscillatory spindle drive mechanism 208 (FIGS. 9, 9A and 10) forming part of a stator winding head 210. An improved lead pull assembly, generally designated 212, is provided to hold and manipulate the magnet wire W as needed when the winding head 210 is not operating to wind coils. A lead wire connect assembly, generally designated 214, is provided for ensuring that the stator coil lead wires SW and FW are satisfactorily connected to the terminal boxes 116 and to assist in looping the magnet wire W around the wire guiding posts 118 when that operation occurs. Also provided at the winding station of FIG. 1 is a cross-over wire retaining assembly 216 used to retain cross-over wire segments 124 against the inside wall of the stator core 102 as needed. The stator winding head 210, the lead pull assembly 212, the lead wire connect assembly 214 and the cross-over wire retaining assembly 216 will be further described below.

Spindle Drive Mechanism 208

As noted above, FIGS. 9, 9A and 10 show a rotary to reciprocatory and oscillatory spindle drive mechanism 208 for reciprocating and oscillating the stator winding spindle 206 to wind coils of magnet wire on stator cores. In accordance with this invention, the drive mechanism 208 can also automatically change the circumferential positions of the stator winding spindle 206 so that the spindle 206 may be used at one time to wind the coil C1 on the lower pole piece 106 and at a later time to wind a coil of wire on the upper pole piece 108. This is accomplished without changing the position of the stator being wound.

Figure 9:
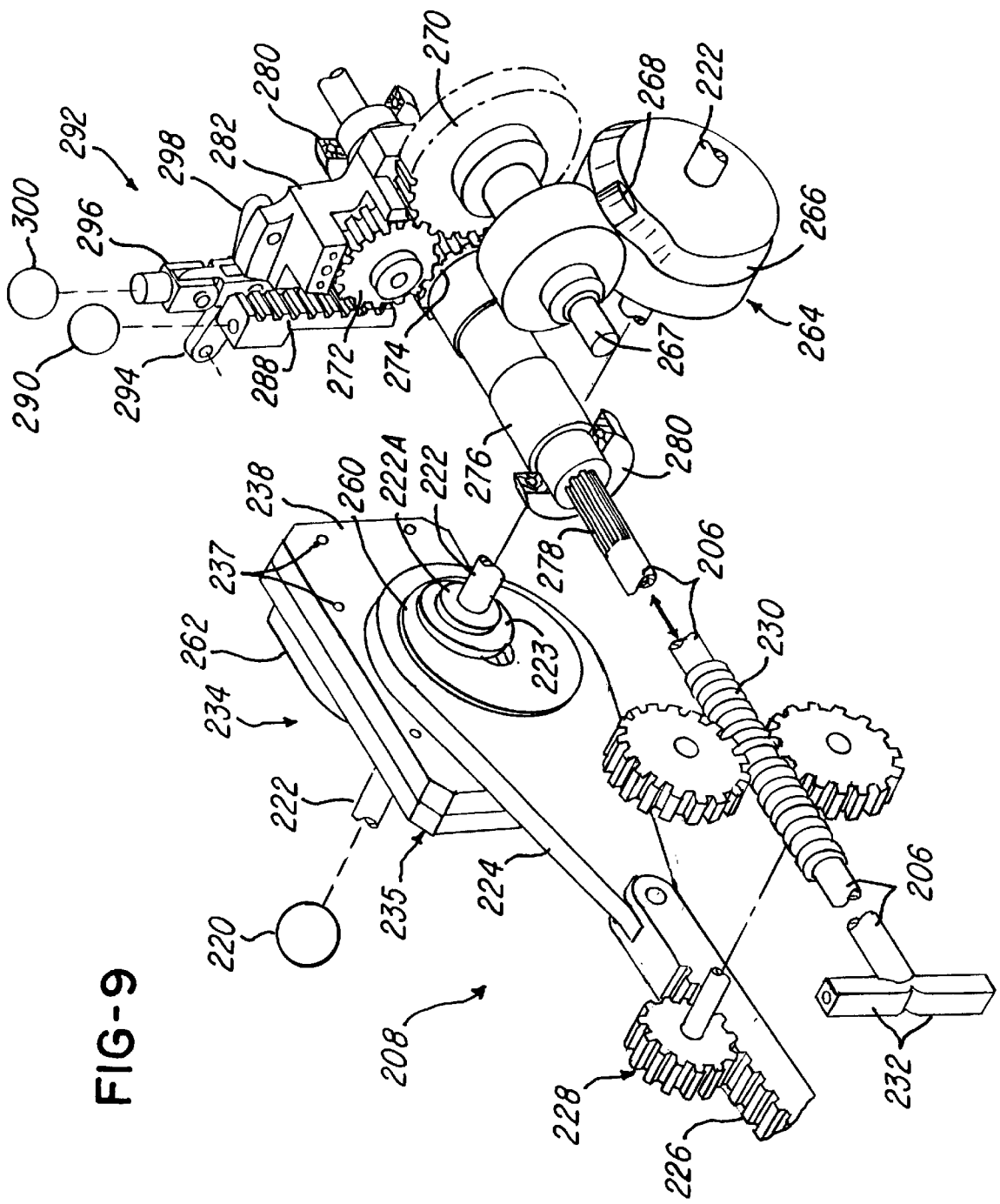
FIG. 9 is a partly diagrammatic, fragmentary perspective view of a spindle drive mechanism of this invention.
Figure 9A:
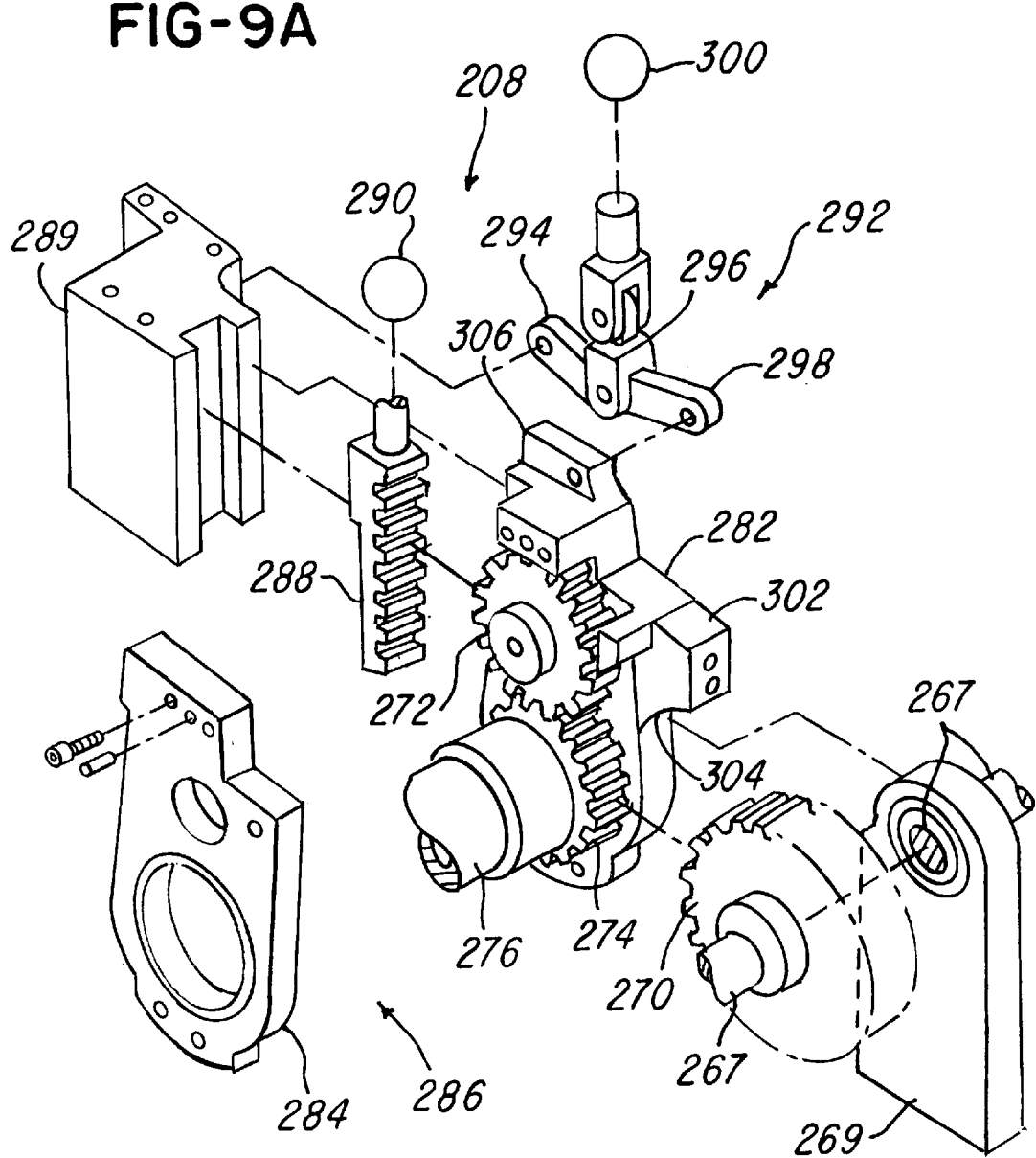
FIG. 9A is a partly diagrammatic, fragmentary, exploded perspective view of a portion of the spindle drive mechanism of FIG. 9.

With continued reference to FIGS. 9, 9A and 10, the spindle drive mechanism 208 includes a driving assembly, indicated schematically at 220, which includes a reversible electric drive motor (not shown) and a suitable drive train, such as pulleys (one of which is shown by phantom lines P in FIG. 10), and a timing belt (not shown), for transmission of the rotary motion to a main drive shaft 222.

Rotation of the main drive shaft 222 is transmitted to an orbital motion of a crank 224 that in turn causes a reciprocating drive rack 226 to move in a direction parallel to the longitudinal axis of the winding spindle 206. The drive rack 226 is connected by a drive gear assembly 228 to an external worm gear 230 formed on the winding spindle 206. As is evident, reciprocating movements of the drive rack 226 cause the winding spindle 206 to reciprocate so that wire exit needles 232 at the front end of the winding spindle 206 move back and forth through a stator located at the winding station.

Adjustment of the stroke of the winding spindle 206 can be obtained by use of a stroke adjusting assembly 234 shown in FIGS. 9 and 10. Briefly, an adjusting screw 236 that extends diametrically through the main drive shaft 222 is rotatably mounted in a housing 235 formed by a pair of housing plates 238 that are keyed to the main drive shaft 222 and are held together by several screws 237 to form a housing for the adjusting screw 236. The adjusting screw 236 has reduced diameter end portions rotatably received within bores in small steel plates 248 that are confined within the housing 235. This construction enables making the housing 235 from aluminum to minimize weight and provides an inexpensive yet rugged way to support the adjusting screw 236 for rotation while preventing axial movement thereof. The adjusting screw 236 has two sets of screw threads 240 and 242 which have mutually oppositely handed threads that respectively are threadedly engaged with respective drive elements 244 and 246 which are held against rotation by engagement of portions thereof within guide slots 252 in the housing plates 238. The first drive element 244 has a drive rod 250 that extends through one of the guide slots 252 into a hole 254 in a stroke adjusting plate 256 rotatably connected to the crank 224 by a bearing assembly 258. A companion adjusting plate 260 is bolted to the stroke adjusting plate 256 and connected to the crank 224 by an identical bearing assembly 258. (To avoid a confusion of lines, the bearing assemblies 258 are represented in the drawings by several ball elements. The actual preferred bearing assemblies 258 comprise bearing assemblies including inner and outer races (not shown).) As is apparent, the adjusting screw 236 can be rotated by a suitable tool (not shown) engaged with a slot in one end of the adjusting screw 236 to change the eccentricity of the crank 224, and thereby the length of the reciprocating stroke of the winding spindle 206. At the same time, the second drive element 246 moves a counterbalance plate 262 in a direction opposite the direction of movement of the stroke adjustment plates 256 and 260. After a desired adjustment of the eccentricity of the crank 224 is completed, that adjustment is maintained by clamping the parts of the adjusting assembly 234 together. For this purpose, the main drive shaft 222 has a shoulder 222A (FIG. 9) that bears against a clamping washer 223 sandwiched between the stroke adjustment plate 260 and the shaft shoulder 222A. In addition, a clamping screw 222B is threaded into the drive end of the main drive shaft 222 and a jamb nut 222C. The clamping screw 222B can be rotated to push a clamping bar 263 extended transversely through the main drive shaft 222 into engagement with a clamp plate 263A that bears against the rear face of the counterbalance plate 262. As evident, the clamping screw 222B can be rotated by a screw driver (not shown) to clamp the parts of the stroke adjusting assembly 234 together. Later on, the clamping screw 222B can be backed off to permit further adjustment of the eccentricity of the crank 224 and, accordingly, the length of the reciprocal stroke of the winding spindle 206.

The oscillatory motion of the winding spindle 206 is caused by rotation of a Ferguson cam drive assembly 264 which includes a cam 266 rotatably driven by the main drive shaft 222 and a cam follower 268 mounted on one end of a cross shaft 267 and engaged with the cam 266. The other end of the cross shaft 267 is supported in a bearing support housing (not shown). Oscillations of the cam follower 268 are imparted to a drive gear 270, also mounted on the cross shaft 267, which releasably engages an intermediate drive pinion 272 that meshes with a driven pinion gear 274 fixed on a drive sleeve 276 that has internal splines slidably engaged with complementary splines on a splined section 278 of the winding spindle 206. Axial motion of the drive sleeve 276 is prevented by a pair of spaced thrust bearings 280.

The spindle drive mechanism 208 as thus far described is essentially old in the art. In normal operation of both the prior art and of the spindle drive mechanism of FIGS. 9, 9A and 10, rotation of the main drive shaft 222 produces the adjusted-length reciprocating and the oscillating motion of the winding spindle 206.

In accordance with this invention, the winding spindle 206 can be rotated automatically through 180° in order to reposition the winding spindle 206 for successively winding stator coils from a single strand of magnet wire about respective diametrically opposed pole pieces, as required by the winding patterns shown in FIGS. 13 and 14.

With reference to FIGS. 9 and 9A, the intermediate drive pinion 272 is journaled for rotation in a support block 282 and a support plate 284 that are affixed together by screws to form an intermediate drive pinion-support assembly, generally designated 286, that is rotatably mounted on the drive sleeve 276. A generally vertically oriented drive rack 288 is slidably confined by a rack guide 289 affixed in the housing of the stator winding head 210 between the support block 282 and the support plate 284 and connected to the piston rod of an air-operated drive cylinder 290. The intermediate drive gear support assembly 286 can be rotated by operation of a gear shifting assembly, generally designated 292, about the axis of the spindle 206 to thereby move the intermediate drive pinion 272 out of engagement with the oscillatory drive gear 270 and into engagement with the drive rack 288. When the intermediate drive pinion 272 is engaged with the drive rack 288, the drive rack 288 can be driven by its associated rack drive actuator 290 to rotate the winding spindle 206 through 180° in order to reposition the winding spindle 206 for winding a stator coil on a different pole piece.

The gear shifting assembly 292 could take various different forms. The illustrated assembly 292 comprises a first, anchored link 294 having one end connected to the rack guide 289 and its other end connected to a clevis 296. A second, movable link 298 has one end pivotally connected to the clevis 296 and its other end pivotally connected to the support block 282 of the intermediate drive gear support assembly 286. The clevis 296 can be driven downwardly by a gear shifting cylinder 300 to cause the intermediate drive gear support assembly 286 to pivot in a counterclockwise direction (as viewed in FIG. 9) whereupon the intermediate drive pinion 272 is brought into engagement with the drive rack 288. The rack drive cylinder 290 can then be energized to extend the drive rack 288 downwardly to rotate the winding spindle 206 to reposition the wire exit needles 232. After the drive rack 288 causes the winding spindle 206 to be repositioned, the intermediate drive gear support assembly 286 can be returned in a clockwise direction to the position shown in FIG. 9 in which the intermediate drive pinion 272 is again drivingly engaged with the drive gear 270. The drive rack 288 remains in its lower, extended position throughout the winding of the second coil C1. (Preferably, the first coil of the next stator to be wound will be the upper coil instead of the lower coil so that the drive rack 288 will not be retracted upwardly until the first, upper coil of the next stator is fully wound. Thus, the first coil wound on successively-wound stators preferably alternates between the upper and lower coils. By following this scheme, the drive rack 288 only moves when engaged with the intermediate drive pinion 272.) Of course, throughout the movements of the intermediate drive pinion 272, it remains engaged with the driven pinion 274. Preferably there will be a brief interval during the movement of the intermediate drive pinion 272 in either direction when it engages both the drive gear 270 and the drive rack 288 to ensure that there is no loss of timing. To avoid over travel of the intermediate drive gear support assembly 286 in its clockwise direction of motion (as viewed in FIG. 9), a stop block 302 on the mounting block 282 is provided for engaging the bearing support housing 269 at the optimal end of the clockwise travel. This can be adjusted during manufacture of the apparatus of this invention by appropriately grinding the stop surface, designated 304, of the stop block 302. To prevent over travel in the counterclockwise direction, a stop surface 306 on the mounting block 282 engages the rack guide 289.

Lead Pull Assembly 212

With reference to FIGS. 1 through 5, the lead pull assembly 212 comprises a first, lower lead pull mechanism 320 located below the axis of reciprocation and oscillation of the winding spindle 206 and a second, upper lead pull mechanism 322 located above the axis of reciprocation and oscillation of the winding spindle 206. Both the upper and lower mechanisms 320 and 322 are preferably mounted on a single mounting plate 324 located between a stator 100 at the winding station and the winding head 210. The mounting plate 324 has a large central window 324A through which the winding spindle 206 extends. Each lead pull mechanism 320 and 322 includes a drive screw 326 mounted on a support bracket 328 for rotation about a horizontal axis. The lower and upper drive screws 326 have respectively oppositely handed screw threads and are both driven in the same direction by a single, programmably operable drive motor (not shown). The drive motor and its connections to the drive screws 326 are not illustrated herein but may be the same as those shown in FIG. 17 of the Beakes et al. '405 patent. But for the difference in the handedness of the screw threads, the lower and upper mechanisms 320 and 322 are essentially identically constructed except for their orientation, one facing upwardly and the other facing downwardly. Accordingly, only the lower lead pull mechanism 320 is described below, it being understood that the description applies also to the upper lead pull mechanism 322. In the drawings like reference numbers are applied to like parts of both lead pull mechanisms 320 and 322.

An important purpose of the lead pull mechanism 320 of this invention is to operate and position a wire gripper, generally designated 330. In addition, the lead pull mechanism 320 is used to manipulate two wire guide members or pins 332 and 334, for reasons which will be discussed below. The lead pull mechanism 320 includes a horizontally-movable, generally U-shaped carriage 336 movable along parallel horizontal guide rails 338 and having a ball screw connection (not shown) to the drive screw 326. Connected as by bolts to the front face of the carriage 336 is an assembly mounting plate 339 to which is connected a vertical actuator support plate 340 that supports, by means of a pair of horizontal support brackets 341, a vertical carriage drive actuator 342 and an opposing mid-position or "bucking" actuator 344.

In addition, a bearing block 346 for a vertically-movable bearing rail 348 is also connected to the vertical actuator support plate 340. A support frame, generally designated 352 fabricated as an aluminum weldment is mounted on the bearing rail 348 and comprises a vertically-oriented support plate 354 bolted to the bearing rail 348, a horizontal support plate 356, and a pair of wire guide pin guide blocks 358 which extend upwardly from a pair of vertical support stanchions 359 which in turn extend upwardly from the vertically-oriented support plate 354.

A pair of wire guide pin actuators 360 are supported atop the horizontal support plate 356. Each pin actuator 360 includes a platform 362 at the free end of its piston rod to which a guide pin clamp plate 366 is connected by bolts. Each of the illustrated guide pins 332 comprises a cylindrical rod 332A and a wire-trapping pin 332B extending diametrically across the uppermost, free end of the rod 332A at a slight angle to horizontal. Each of the guide pins 334 comprises a cylindrical rod 334A having a reduced-diameter groove 334B near its uppermost, free end so that a head 334C is formed at the top of the rod 334. A shoulder is formed beneath the head 334C which can be used to engage and move segments of coil lead wires as will become apparent. The pin clamp plates 366 are provided to enable adjustments of the vertical excursions of the wire guide pins 332 and 334.

Figure 2:
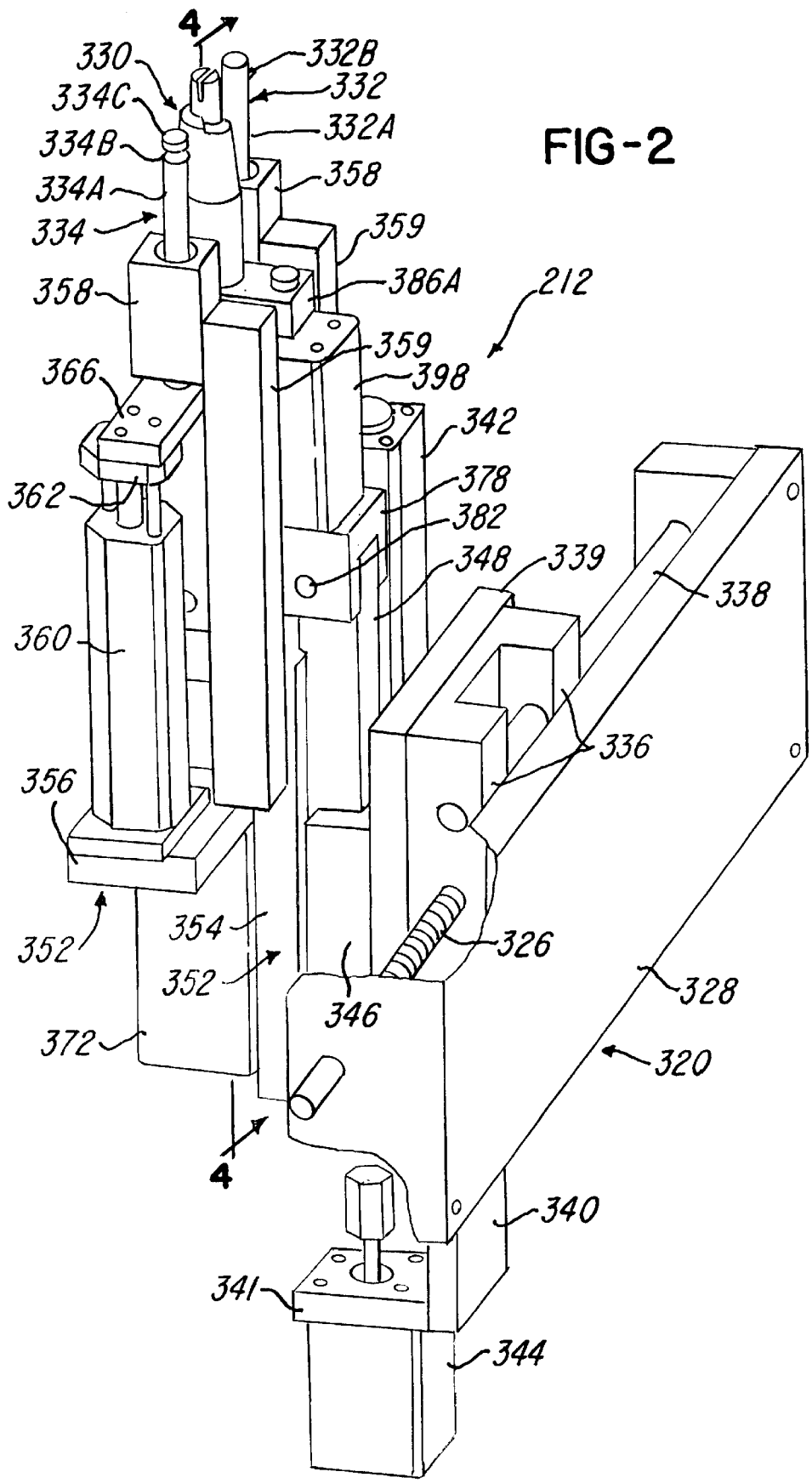
FIG. 2 is a perspective view, with parts broken away, of a lower lead pull assembly forming part of the machine of FIG. 1, as viewed generally from the back and right side thereof.
Figure 3:
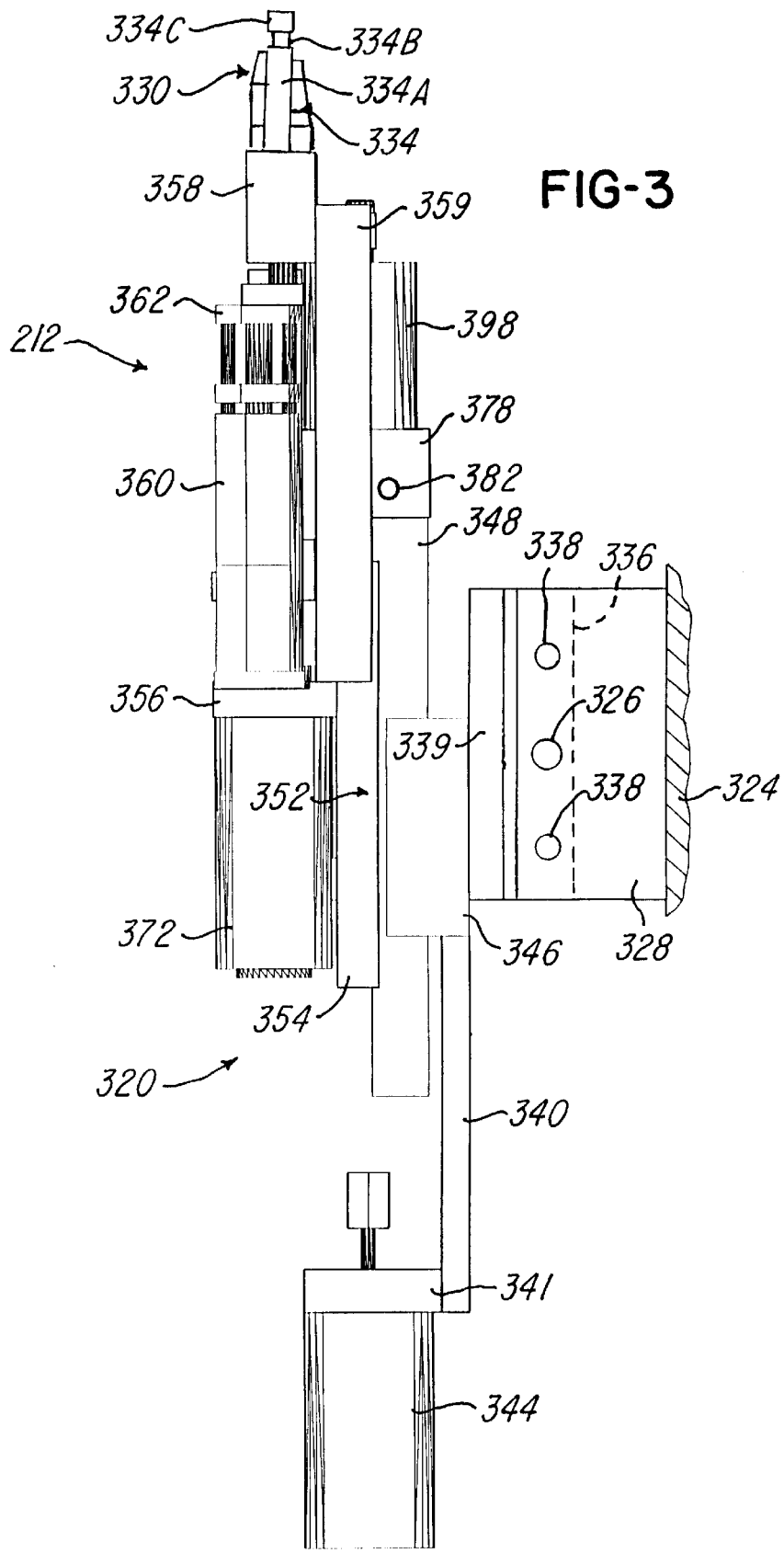
FIG. 3 is a fragmentary, right side elevational view of the lower lead pull assembly.
Figure 4:
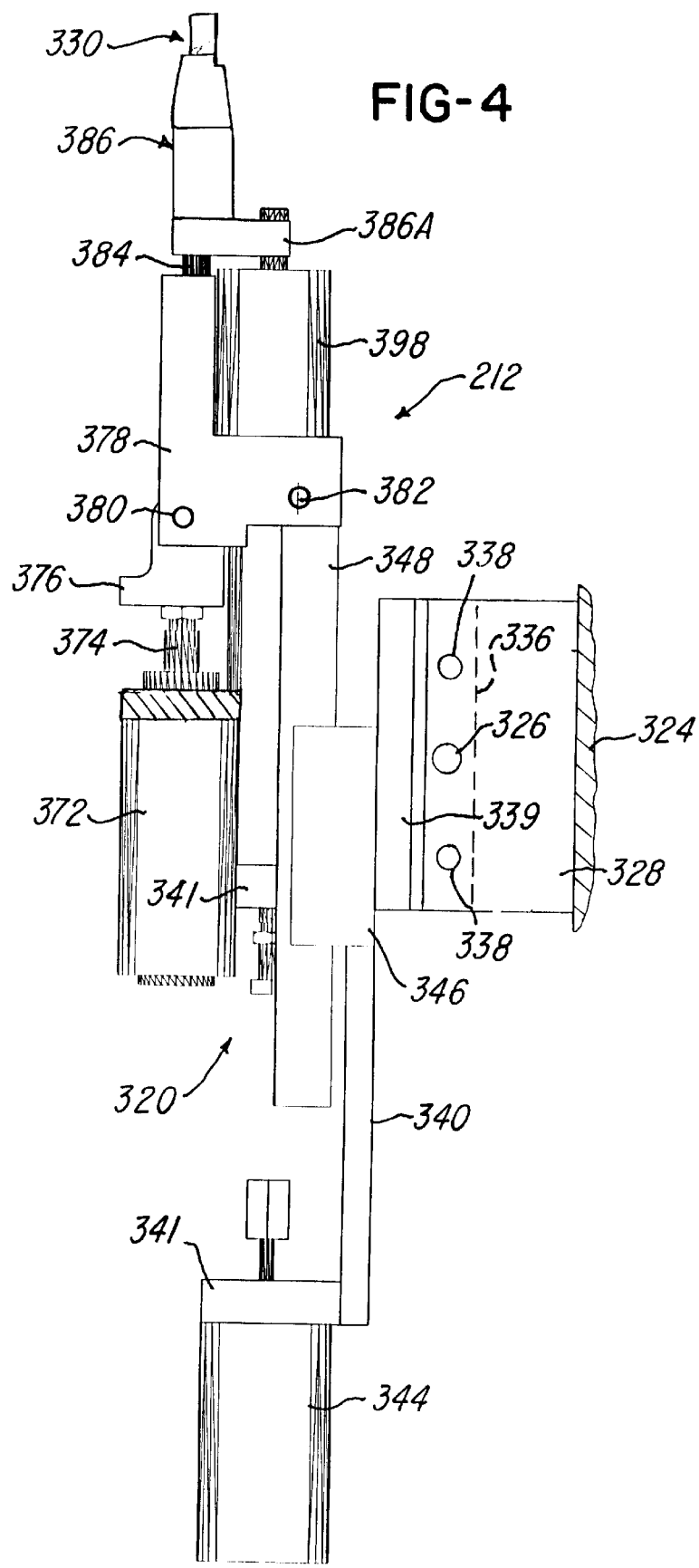
FIG. 4 is fragmentary, vertical cross-sectional view of the lower lead pull assembly taken on line 4—4 of FIG. 2.
Figure 5:
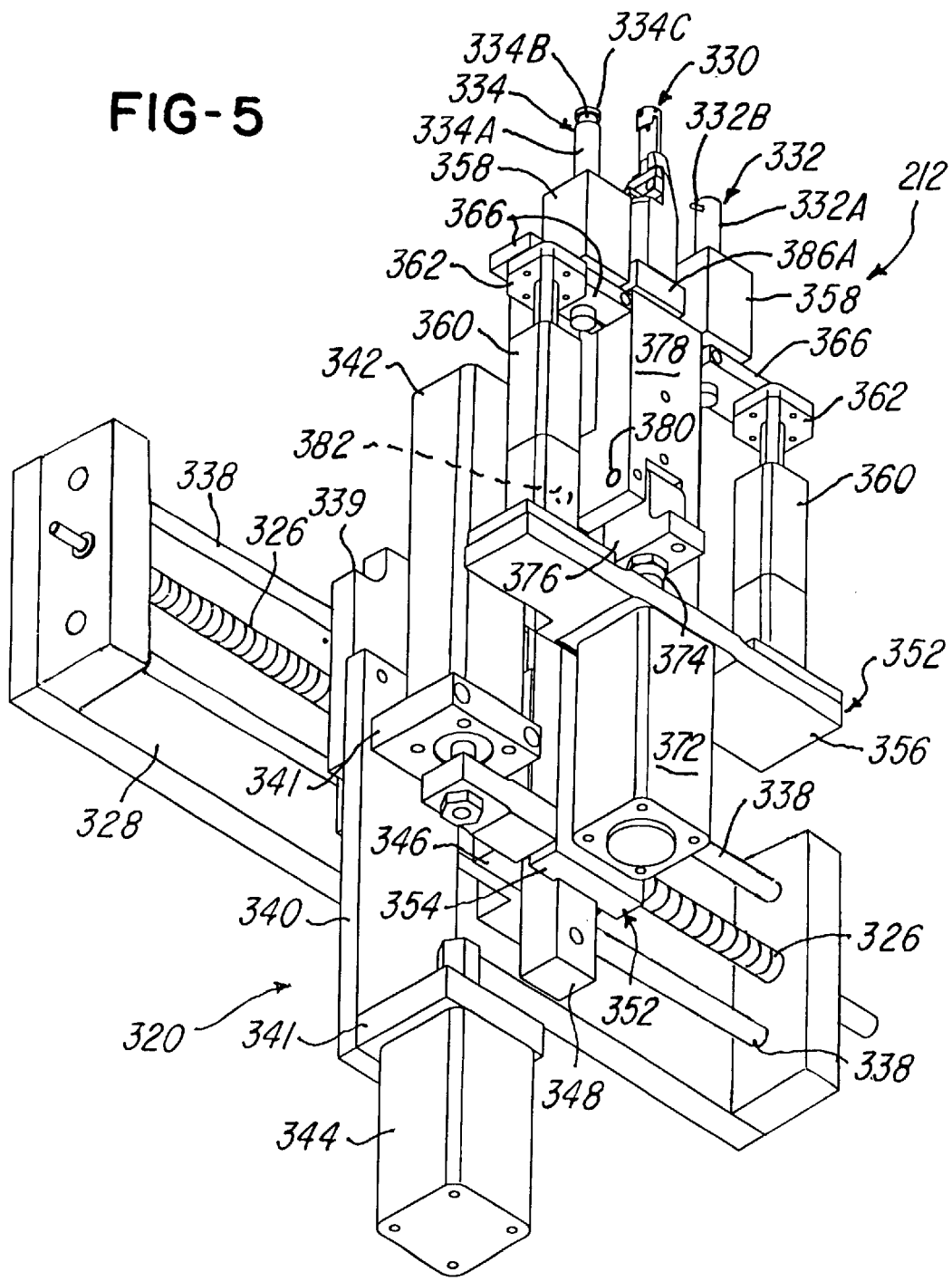
FIG. 5 is a perspective view of the lower lead pull assembly as viewed generally from the bottom and left side thereof.

With reference to FIGS. 2, 3 and 4, a gripper pivoting actuator 372 is mounted on the horizontal support plate 356 and has a piston rod 374 provided with a fitting 376 pivotally connected to a gripper support block 378 by a first pivot pin 380. The pivot block 378 is pivotally connected to the upper end of the bearing rail 348 by a second pivot pin 382. As best seen in FIG. 4, retraction of the piston rod 374 will cause the gripper support block 378 to rotate or pivot in a counter-clockwise direction about the horizontal center axis of the second pivot pin 382, to cause the wire gripper 330 to pivot to a position closer to a stator at the winding station.

With reference to FIGS. 2, 3, 4 and 46 (drawing sheet 22), the wire gripper 330 comprises a gripping rod 384 fixedly connected to the gripper support block 378 and a generally cylindrical clamping and cutting member 386 which is slidably mounted on the gripping rod 384. It will be observed that the wire gripper 330 as shown in FIG. 46 is upside down from the representations thereof in FIGS. 2, 3 and 4. The free end of the gripping rod 384 is formed as a hook 388 and provided with a spring-biased, wire-retaining latch 390 for retaining a segment of a lead wire in the hook 388. An L-shaped wire clamp member 392 is slidably mounted in a passageway formed between a flat 394 on the gripping rod 384 and a groove formed in the confronting face of a cover plate 396 and is biased toward the hook 388 by a coil spring 397. The clamping and cutting member 386 is movable along the gripping rod 384 toward and away from the hook 388 by the operation of a gripper actuator 398 which is connected thereto by a drive plate 386A that is affixed to the clamping and gripping member 386. In order to clamp a coil lead wire in the hook 388, the gripper actuator 398 moves the clamping and cutting member 386 toward the hook 388 to cause the free end of the wire clamp member 392 to enter the hook 388, camming the catch 390 out of the way, and clampingly engage the lead wire in the hook 388. Continued movement of the clamping and cutting member 386 toward the hook 388 overcomes the bias of the coil spring 397 and enables the coil lead wire to be severed or cut by a shearing action between an edge of the bight of the hook 388 and a shear edge 399 on the clamping and cutting member 386. Thus, the cutting of a coil lead wire occurs only when the wire is firmly clamped within the hook 388. After a coil lead is cut, the lead remains clamped in the hook until the gripper actuator 398 is operated to retract the clamping and cutting member 386 away from the hook 388.

Lead Wire Connect Assembly 214

Figure 6:
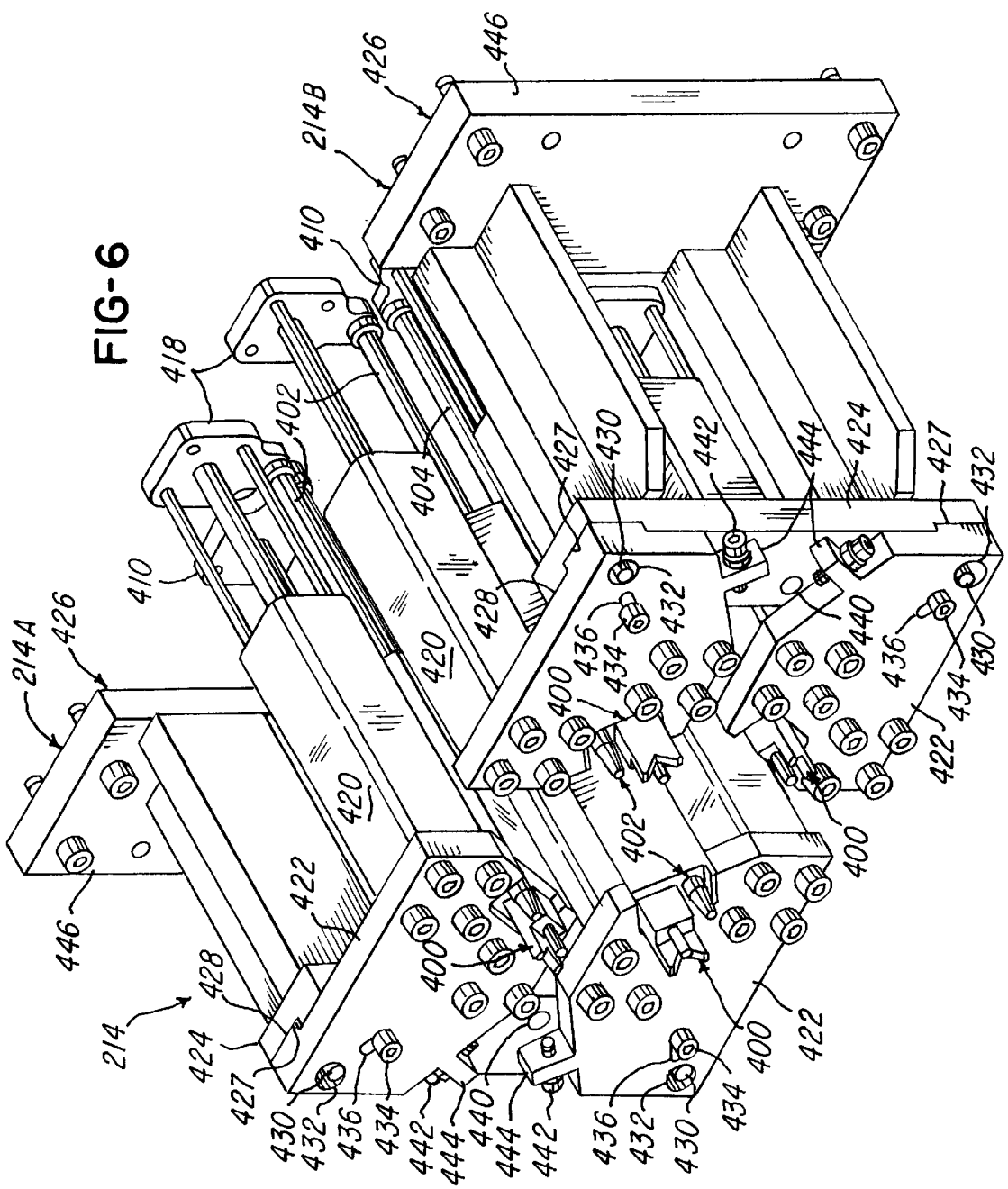
FIG. 6 is a perspective view of a lead wire connect assembly forming part of the machine of FIG. 1.
Figure 7:
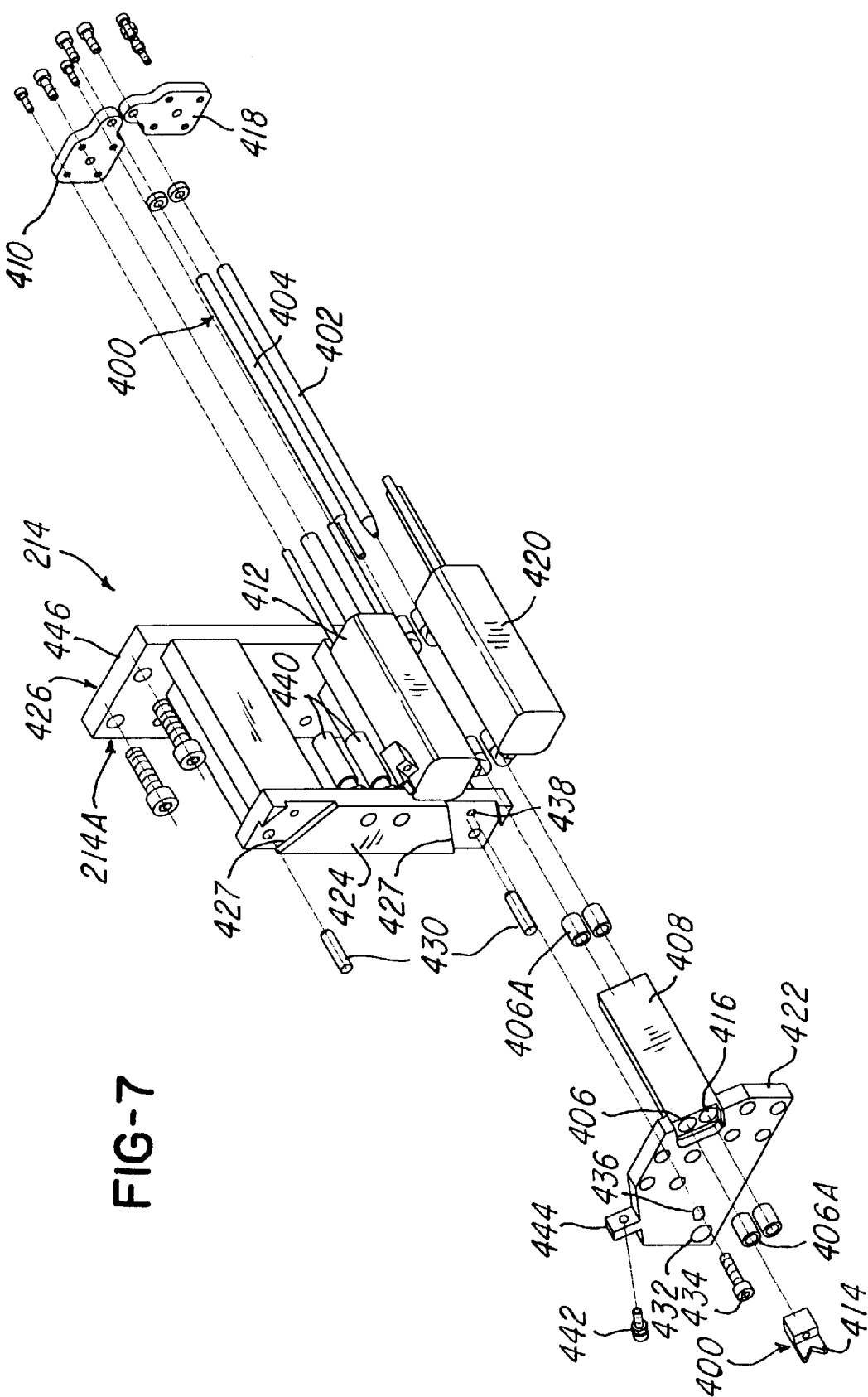
FIG. 7 is an exploded perspective view of a portion of the lead wire connect assembly.

With reference to FIGS. 1, 6 and 7, to satisfactorily connect the stator coil lead wires SW and FW to the terminal boxes 116, and to assist in looping the magnet wire W around the wire guiding posts 118 when that operation occurs, the lead wire connect assembly 214 includes an array of four mutually spaced lead wire stuffing members 400 and an array of four mutually spaced lead wire looping pins 402. FIG. 7 shows a representative stuffing member 400 and an accompanying looping pin 402. The stuffing member 400 of FIG. 7 comprises a stuffing rod 404 that extends through bushings 406A in a first guide bore 406 that extends completely through a guide block 408 and has a rearward end connected to a yoke 410 driven by a lead stuffing actuator 412. The free, forward end of the stuffing rod 404 has a reduced diameter front end which has affixed thereto a wire positioning blade 414.

The looping pin 402 extends through a second guide bore 416 in the same guide block 408 and has a rearward end connected to a yoke 418 driven by a wire looping actuator 420. Looping pin 402 tapers to a reduced-diameter front end which is recessed or hollow so that it may extend over, and thus partly receive, the free end of a wire guiding post 118 projecting from the terminal board of a stator being wound, as will be further discussed below.

The actuators 412 and 420 are both fixedly connected as by bolts to the rear face of an actuator mounting plate 422 which is adjustably fixed to a front, guide plate 424 of an actuator mounting bracket assembly 426. Adjustment of the position of the actuator mounting plate 422 is enabled by providing the guide plate 424 with a first keyway 427 which slidably receives a key 428 formed on the rear face of the actuator mounting plate 422. This enables the actuator mounting plate 422 to be moved between two operative positions so that the same lead connect assembly 214 can be used for connecting stator coil lead wires for stators having two different locations of terminal boxes 116 and wire guiding posts 118. The operative positions are determined by mutually-engaging stop surfaces on the actuator mounting plate 422 and the guide plate 424. As seen best in FIGS. 6 and 7, such stops can be formed by a dowel or stop pin 430 that projects forwardly from the front face of the guide plate 424 and a relatively large stop bore 432 that extends through the acutator mounting plate 422. This arrangement permits the actuator mounting plate to slide from a first position at which the stop pin 430 engages the one margin of the stop bore 432 to a second position at which the stop pin 430 engages the diametrically opposite margin of the stop bore 432. A clamp bolt 434 that extends through an elongate slot 436 in the actuator mounting plate 422 into threaded engagement with a tapped hole 438 in the guide plate 424 is used to clamp the actuator mounting plate 422 to the guide plate 424.

Referring to FIG. 7, a proximity probe 440 is mounted on the guide plate 424 which cooperates with a locating screw 442 threaded in a bore of a flag member 444 on the actuator mounting plate 422. If the actuator mounting plate 422 is located either at a position in which the probe 440 detects the locating screw 442 or at a different position in which the locating screw 442 is not detected by the probe 440, the machine control circuitry (not shown) will react to that location information to determine if the machine is set up for winding the stator for which the lead connect assembly 214 is adjusted.

As evident from an inspection of FIGS. 1, 6 and 7, there is a second wire stuffing member 400 and an accompanying wire looping pin 402 mounted on the same actuator mounting bracket assembly 426. The bracket assembly 426 includes a base plate 446 which is mounted on the mounting plate 324 on one side of its window 324A. The mounting bracket assembly 426 and the components mounted thereon are considered to constitute a first wire connect subassembly, and is generally designated 214A. An essentially identical, second wire connect subassembly, generally designated 214B, is mounted to the mounting plate 324 (FIG. 1) on the opposite side of the window 324A from the subassembly 214A. Like reference numbers are applied to like components of both subassemblies 214A and 214B. Since the subassemblies 214A and 214B are essentially identical, no further description of them is necessary.

Cross-over Wire Retaining Assembly 216

As mentioned above, a cross-over wire segment 124 is created when winding a stator in accordance with a winding pattern which, in accordance with this invention, involves rotating the winding spindle or ram through 180° after the winding of a first coil. Such a cross-over wire segment can interfere with the winding of the second coil and must be moved to a protected position adjacent the inside wall of the stator bore or else it could interfere with the operation of the stator. Moving the cross-over wire segment 124 to a protected position is automatically accomplished in accordance with the present invention by means of the cross-over wire retaining assembly 216.

Figure 8:
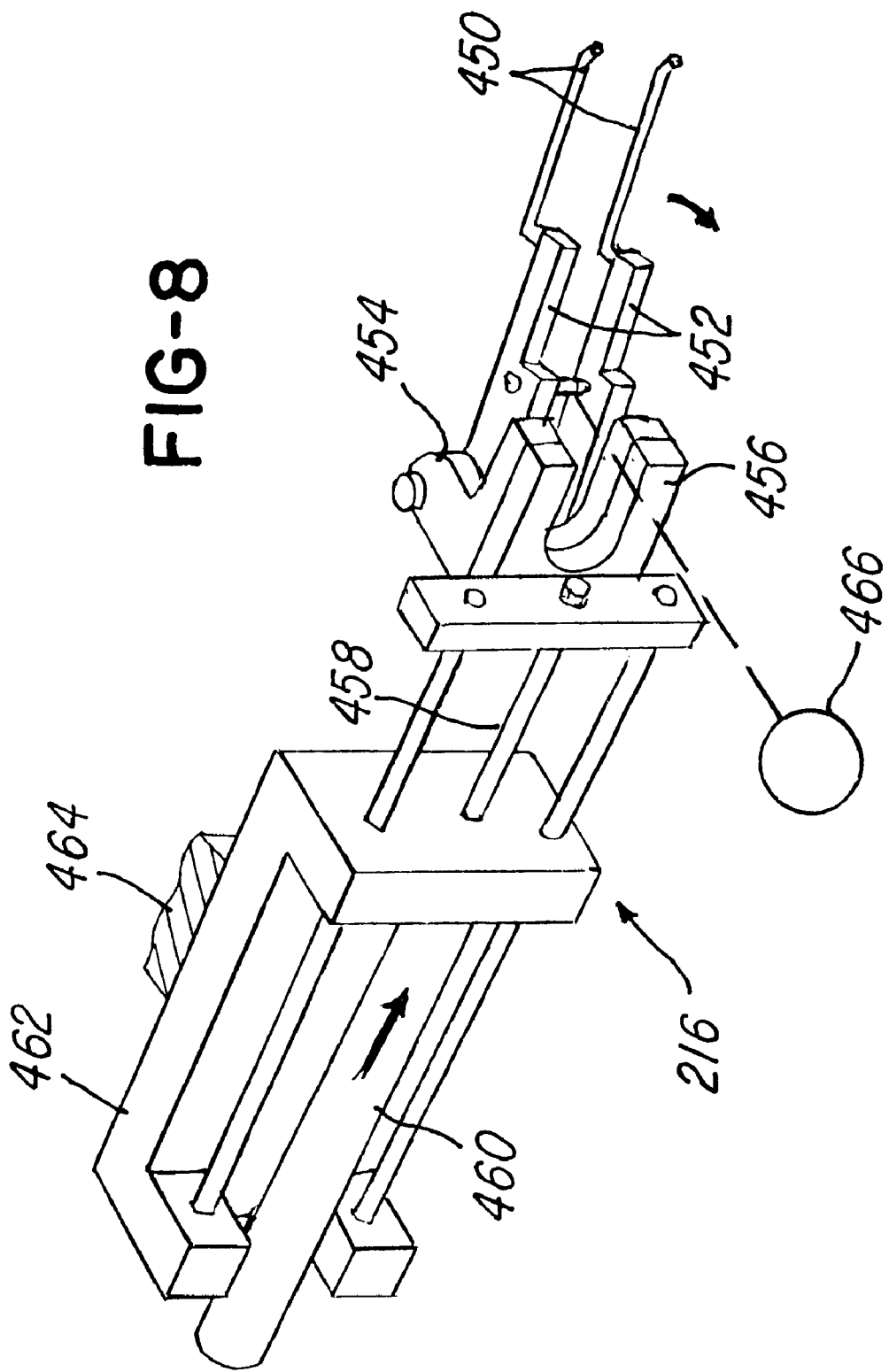
FIG. 8 is a perspective view of a cross-over wire retaining assembly forming part of the machine of FIG. 1.

With reference to FIGS. 1 and 8, the cross-over wire retaining assembly 216 comprises a pair of wire clamping or retaining fingers 450 that extend rearwardly from a pair of support levers 452 that are pivotally mounted on a retaining finger support bracket 454. The support bracket 454 is mounted on a yoke 456 carried by the piston rod 458 of a wire retainer positioning actuator 460 that is supported by a mounting bracket 462 which in turn is supported by a stanchion 464 in front of a stator being wound. The wire retainer positioning actuator 460 operates to retract the retaining fingers 450 from a stator at the winding station and to extend the retaining fingers 450 into the stator bore of the stator after the winding spindle or ram 206 is rotated through 360° following the winding of a first coil on one pole piece and before the commencement of the winding of the second coil on the other pole piece. When the wire retaining fingers 450 are extended into the stator bore 104, the fingers 450 are in a position in which they move past and overlie the cross-over wire segment. Thereafter, a wire retaining finger actuator 466 carried by the yoke 456 is energized to pull the wire retaining fingers 450 toward the inside wall of the stator to trap the cross-over wire segment against the inside wall of the stator. When this occurs, the entire wire retaining assembly 216 is completely out of the path of the winding spindle and its wire exit needles so that the second coil can be wound. After the second coil is fully wound, the wire retaining fingers 450 are pivoted by operation of the wire retaining finger actuator 466 toward the center of the stator bore 104 and then the wire retainer positioning actuator 460 is operated to retract the wire retaining fingers from the stator at the winding station.

Sample Winding and Lead Wire Terminating Sequence

The apparatus of this invention enables the winding of stators having many different configurations of coil lead wires, terminals, and wire guide posts. Following is a step-by-step list of a winding and lead termination sequence which can advantageously be used for winding a stator with the running winding coils and lead terminations shown in FIG. 13.

1. FIG. 18. Start position—with the magnet wire W leading from a wire exit needle 232 to the lower wire gripper 330. Only the single strand of wire W is used for this winding pattern. The wire gripper 330 is fully elevated by operation of the carriage vertical drive actuator 342. The winding shuttle 206 is rotated ¼ turn in a clockwise direction (as viewed from the rear in FIG. 18).

2. FIG. 19. Extend the shuttle 206 through the bore of the stator to extend the magnet wire along one side of the lower pole piece. Rotate the spindle in a counterclockwise direction (as viewed from the rear in FIG. 19). This brings the magnet wire around the front side of the lower pole piece.

Figure 20:
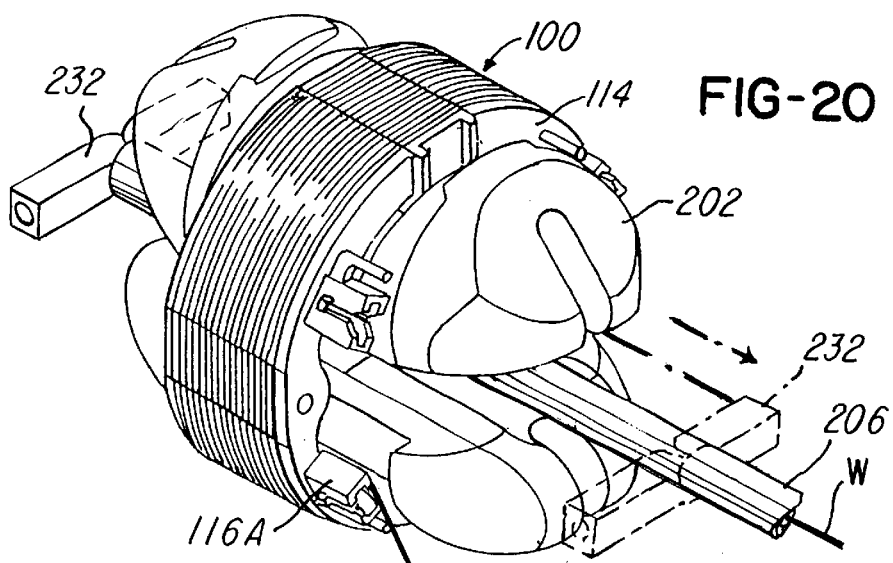

3. FIG. 20. Retract the spindle 206 to draw the magnet wire around the other side of the lower pole piece. This completes a back turn of the magnet wire.

Figure 21:
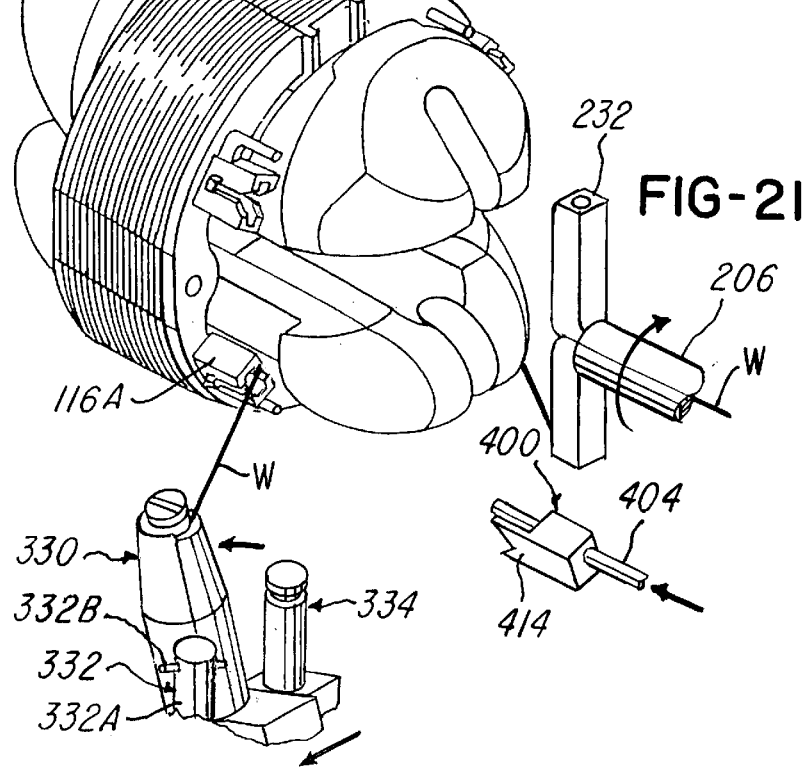

4. FIG. 21. Wire gripper 330 moved sideways by operation of the drive screw 326 and pivoted by operation of the gripper pivoting actuator 372 to place the start wire partly into the terminal box 116A.

Figure 22:
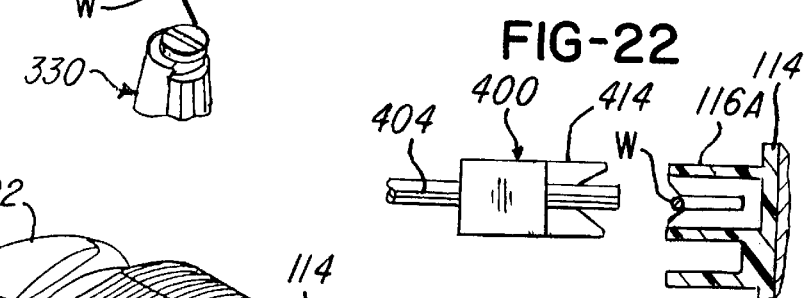

5. FIGS. 22 through 24. Wire stuffing member 400 is extended toward the terminal box 116A. As it nears the box 116A, the notched blade 414 centers the lead wire. When the stuffing member 400 is fully extended, it holds the start lead wire SW in the terminal box 116A. The start lead wire is then released by the wire gripper 330. The wire gripper 330 and the wire guide pins 332 and 334 are moved downwardly to a mid-position by operation of the vertical carriage drive actuator 342 stopped or "bucked" by operation of the bucking actuator 344. The wire gripper 330 and the wire guide pins 332 and 334 are moved under the extended wire stuffing member 400 toward the opposite side of the stator by operation of the drive screw 326.

6. FIGS. 25, 26 and 27. As the wire gripper 330 and the guide members 332 and 334 are moved toward the other side of the stator, the guide member 332 is elevated by its actuator 360 to hook the magnet wire segment between the wire exit needle 332 and the stator core to form a loop 470 in the magnet wire and extend the magnet wire between the terminal box 116B and the adjacent wire guiding post 118B.

7. FIGS. 28 and 29. A wire looping pin 402 is extended over the wire guiding post 118B to keep the post from bending or breaking.

Figure 30:
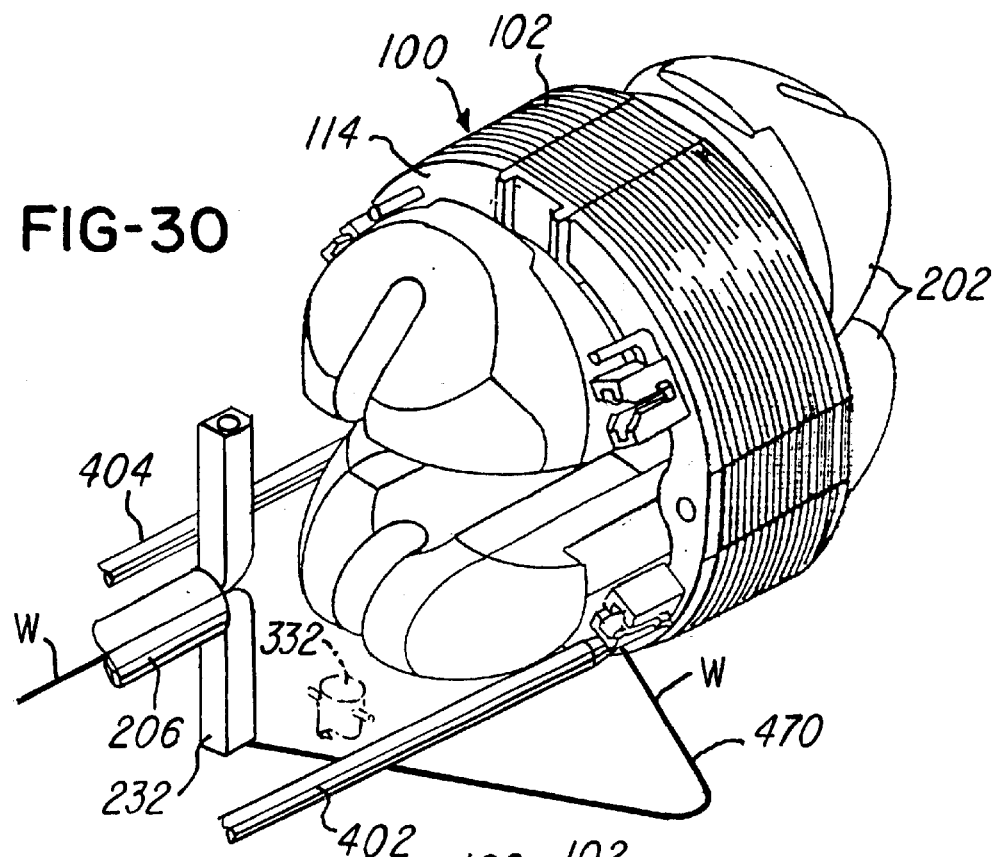

8. FIG. 30. The wire guide member 332 is moved away from the magnet wire loop 470, creating a slack wire condition which permits the wire guide member 332 to move clear away from the loop 470.

Figure 31:
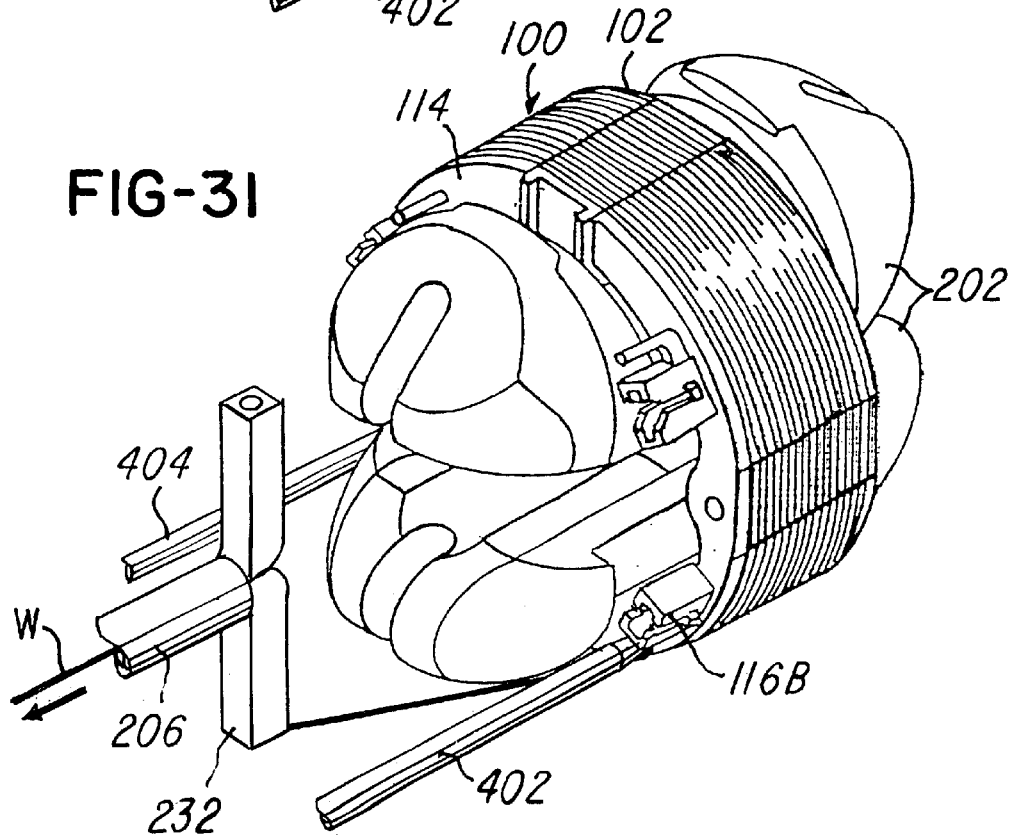
Figure 38:
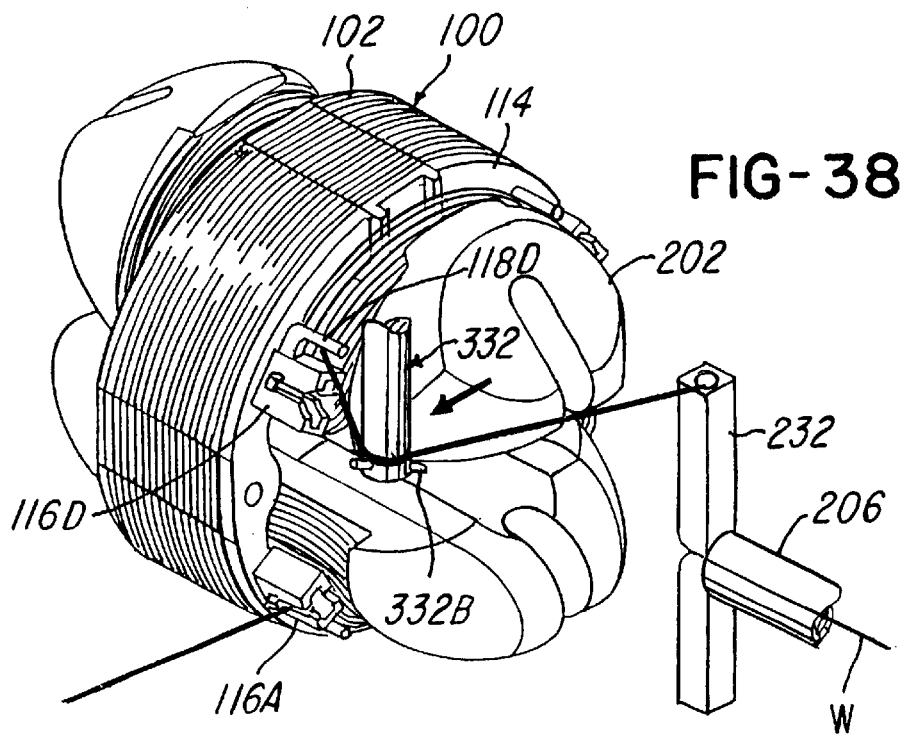
Figure 39:
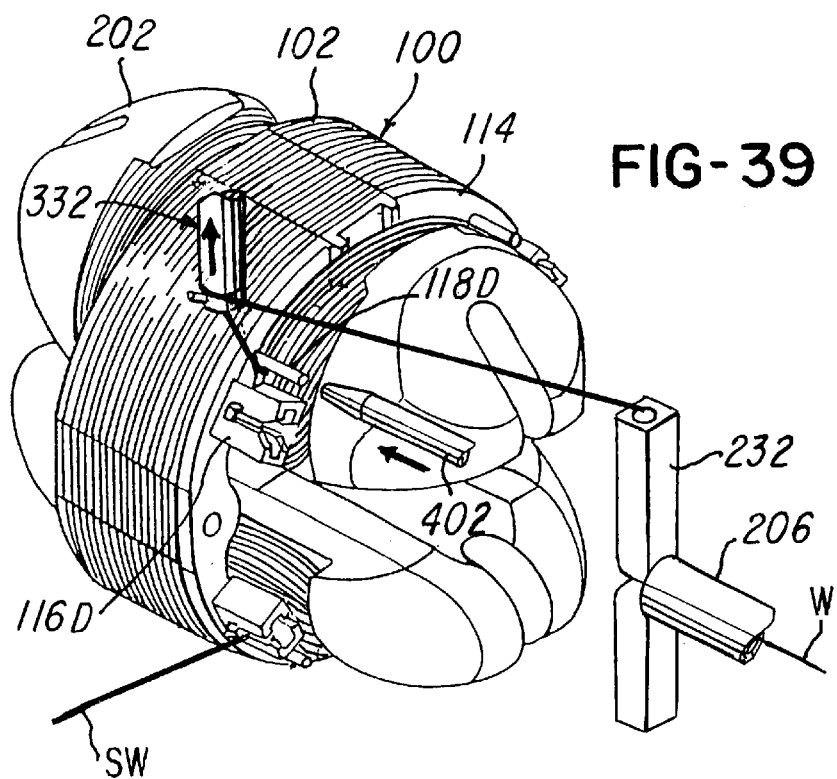
Figure 42:
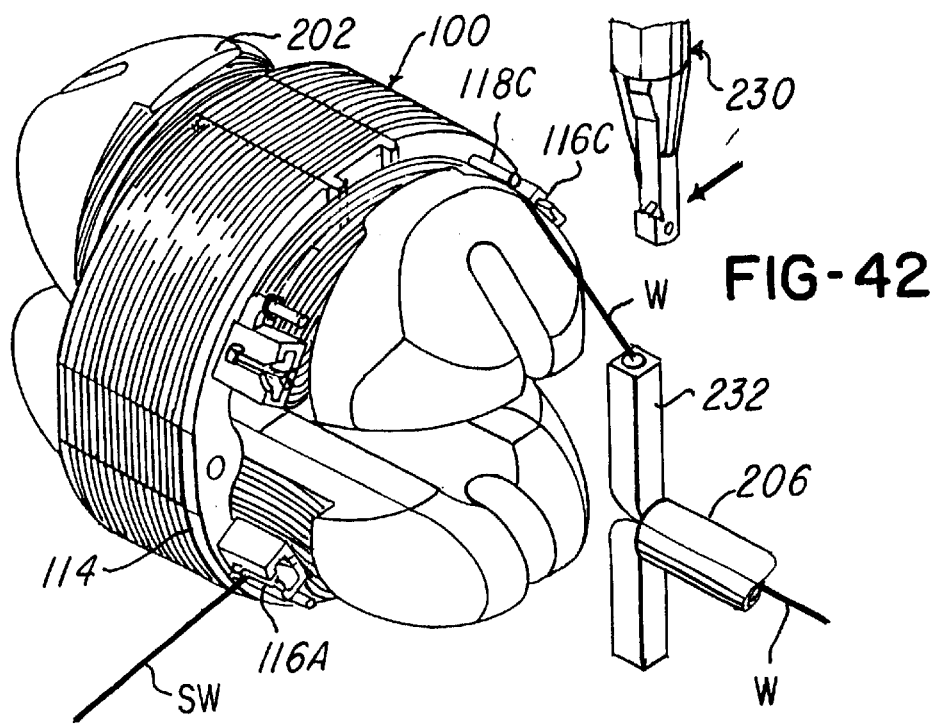
Figure 43:
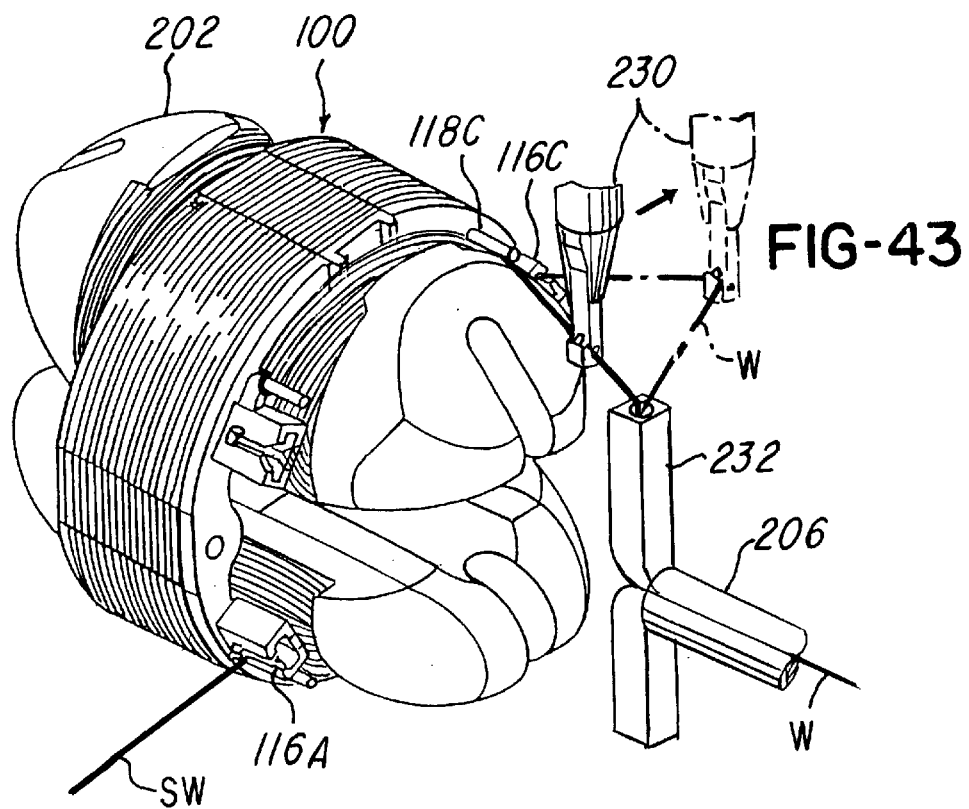
Figure 44:
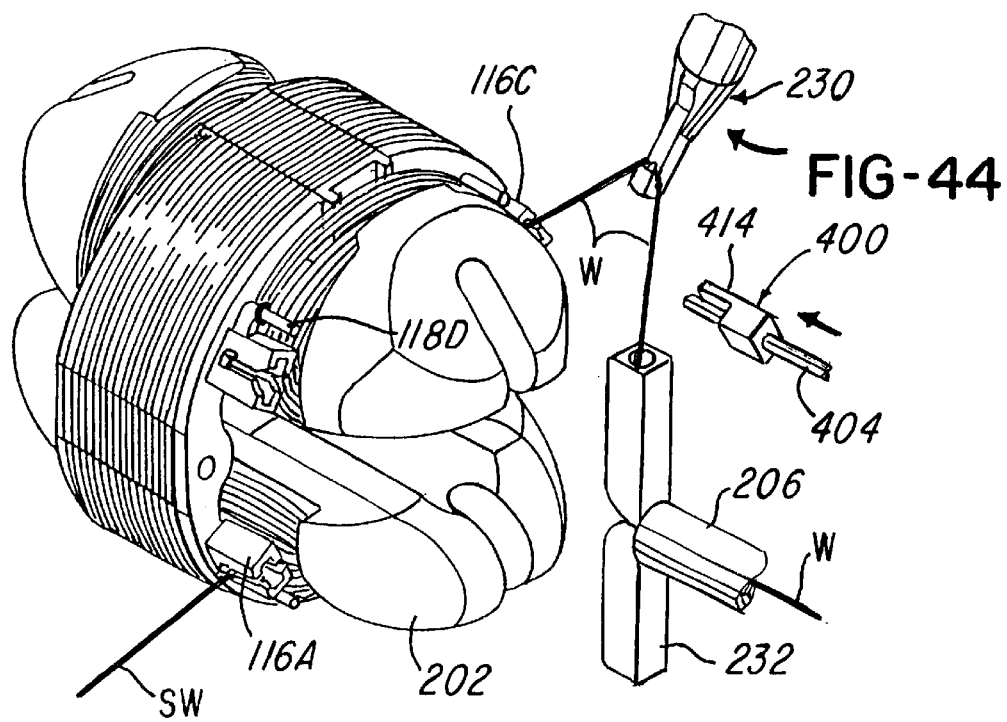

9. FIG. 31. The wire loop 470 is removed by operation of a wire bumper (not shown) which pulls the magnet wire back through the spindle 206, as indicated by the arrow in FIG. 31. Wire bumpers are well known and the particular wire bumper is not described herein.

10. FIGS. 32 and 33. The winding spindle 206 is oscillated and reciprocated to complete the winding of the lower coil C1. At the beginning of this winding cycle, the winding spindle is oscillated by 90° in a counterclockwise direction as viewed in FIG. 32 to cause the magnet wire to be looped partly around the wire guiding post 118B.

11. FIG. 34. The wire stuffing member 400 and the wire looping pin 402 are retracted and the spindle 206 rotated through 180° in a clockwise direction (as viewed in FIG. 34) to reorient the winding spindle 206 so that it can wind the coil C2 around the upper pole piece. Such rotation of the winding spindle 206 is accomplished by rotation of the spindle 206 by the drive rack 288 as described above. This causes the wire exit needle 232 from which the magnet wire W exits to move from extending downwardly to extending upwardly.

12. FIGS. 35 and 36. The cross-over wire retaining fingers 450 are inserted into the bore of the stator and pivoted as described above to trap the cross-over wire segment 124 created during the 180° rotation of the spindle 206 against the inner wall of the stator out of the paths of movement of the exit needles 232. The winding of the upper, second coil C2 is begun by a clockwise rotation of the winding spindle 206, which it may be observed is in a direction opposite to the direction of the winding of the first coil C2. Note: after the reorientation of the winding spindle 206 and before the wire retaining fingers 450 move into the bore of the stator, it may be necessary to move the cross-over wire segment 124 leading from the C1 to the wire exit needle 232 both upwardly to be above the upper cross-over wire retaining finger 450 and toward the near side of the stator core to allow clearance for the cross-over wire retaining fingers 450 to enter the bore of the stator. Such movements of the cross-over wire segment 124 can be accomplished by engaging and moving the segment of the magnet wire near the wire exit needle 232 by operation of the upper wire guiding member 332.

Also, it may be necessary to form a loop, as indicated by phantom lines 472 in FIG. 35, in the magnet wire between the rear end of the upper retaining finger 450 and the wire exit needle 232 before commencing the winding of the coil C2. The loop 472 may be necessary to ensure that the magnet wire does not move under the rearmost upper winding form 202 at the outset of the winding of the coil C2.

13. FIG. 37. The winding of coil C2 is completed. It will be noted that the retaining fingers 450 remain in the bore of the stator until the second coil is wound. The retaining fingers 450 are then removed from the bore of the stator by operation of the actuators 466 and 460. The upper end of the cross-over wire 124 is effectively wound under the upper coil C2 so the cross-over wire 124 will remain closely adjacent or against the inside wall of the stator after the wire retaining fingers 450 are removed from the bore of the wound stator.

It will be noted that no terminal connections are made between the winding of the coil C1 and the winding of the coil C2.

14. FIGS. 38 through 41 show steps taken to loop the finish lead over the terminal post 118D and form a back turn which takes the finish lead SW of the coil C2 to the same side of the stator as the terminal box 116C. These steps should be amply clear upon inspection in view of the preceding description of similar steps taken in reference to the start wire SW.

Figure 45:
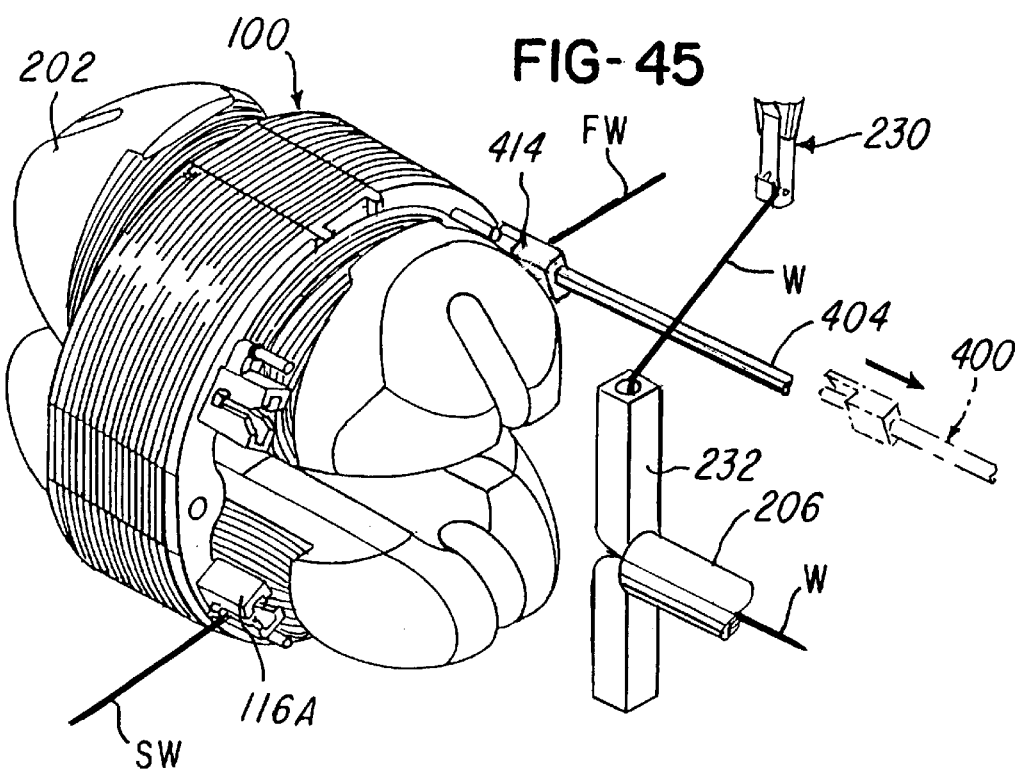

15. FIGS. 42 through 45 illustrate steps taken to place and stuff the finish wire lead FW in the terminal box 116C. These should also be understood upon inspection in view of the preceding description. FIG. 45 also shows the cutting of the finish wire and the holding of the magnet wire extending from the wire exit needle 232 at the end of the winding and lead termination process. Following retraction of the stuffing member 400, the newly wound stator can be removed from the winding station and replaced by an unwound stator. As mentioned above, the upper coil of the next unwound stator is preferably wound first. Accordingly, the winding spindle 206 is oriented to begin the next winding and terminating sequence.

Either before or after the running coils and lead wire terminations are completed, it is contemplated that the stator will have brake coils wound on a different but preferably identical machine.

The tooling parts, particularly the wire guiding members 332 and 334 and the stuffing members 400 may take various different forms as required for the types of stators being wound. Of course, different stator and terminal configurations may require different tooling or operations. Careful control over the degree of tautness or slackness of the magnet wire at different times during the winding of a stator may be required, as must be determined by trial and error.

Although the presently preferred embodiment of this invention has been described, it will be understood that within the purview of the invention various changes may be made within the scope of the following claims.

We claim:

1. A method of automatically winding coils of wire on the pole pieces of a two pole stator with the use of a stator winding machine having a reciprocating and oscillating winding spindle having at least one wire exit needle, which method comprises the steps of:

positioning said winding spindle so that a wire exit needle from which magnet wire extends is in a position to wind wire around a first pole piece;

winding a coil of wire around the first pole piece by repeatedly reciprocating and oscillating said winding spindle;

rotating the winding spindle through 180° to position the wire exit needle from which magnet wire extends in position to wind wire around the second pole piece; and winding a coil of wire around the second pole piece by reciprocating and oscillating said winding spindle.

2. The method of claim 1 wherein a cross-over wire is extended through the bore of the stator when the winding shuttle is rotated through 180°, and further comprising the step of trapping the cross-over wire along a side of the bore so that the cross-over wire will not interfere with the winding of the second coil.

3. The method of claim 2 wherein said cross-over wire is trapped by moving cross-over wire-engaging fingers into the bore of the stator and into engagement with the cross-over wire.

4. The method of claim 1 wherein said winding spindle is oscillated during the winding of coils by a drive assembly including a drive gear rotated in response to rotation of a motor-driven main drive shaft, an intermediate pinion gear engaged with said drive gear, and a driven pinion connected by splines to the winding spindle.

5. The method of claim 4 wherein said winding spindle is repositioned to wind a coil on a different pole piece by moving said intermediate pinion gear into engagement with a rack while maintaining the engagement of said intermediate pinion gear with said driven gear, and moving said rack to rotate said intermediate pinion gear and thereby said winding spindle.

6. The method of claim 1 wherein said first pole piece is an upper pole piece and said second pole piece is a lower pole piece, and wherein said stator is removed from the winding station after the finish wire is inserted into a terminal member and replaced by a second stator, and repeating the steps of claim 1 beginning with the winding of a coil about the lower pole piece.

7. In a method of automatically winding and lead terminating coils of wire on the pole pieces of a two pole stator with the use of a stator winding machine having a reciprocating and oscillating winding spindle having at least one wire exit needle, which method comprises the steps of:

positioning said winding spindle so that a wire exit needle from which magnet wire extends is in a position to wind wire around a first pole piece;

winding a coil of wire around the first pole piece by repeatedly reciprocating and oscillating said winding spindle;

at the beginning of the winding of the coil, inserting the coil start wire into a terminal member on the stator core;

rotating the winding spindle through 180° to position the wire exit needle from which magnet wire extends in position to wind wire around the second pole piece;

winding a coil of wire around the second pole piece by reciprocating and oscillating said winding spindle; and after the winding of the coil around the second pole piece, inserting the latter coil finish wire into a terminal member on the stator core.

8. The method of claim 7 wherein said winding spindle is oscillated during the winding of coils by a drive assembly including a drive gear rotated in response to rotation of a motor-driven main drive shaft, an intermediate pinion gear engaged with said drive gear, and a driven pinion connected by splines to the winding spindle.

9. The method of claim 8 wherein said winding spindle is repositioned to wind a coil on a different pole piece by moving said intermediate pinion gear into engagement with a rack while maintaining the engagement of said intermediate pinion gear with said driven gear, and moving said rack to rotate said intermediate pinion gear and thereby said driven gear and said winding spindle.

10. The method of claim 7 wherein said first pole piece is an upper pole piece and said second pole piece is a lower pole piece, and wherein said stator is removed from the winding station after the finish wire is inserted into a terminal member and replaced by a second stator, and repeating the steps of claim 6 beginning with the winding of a coil about the lower pole piece.

11. The method of claim 7 further comprising the step of looping a segment of the start wire about a first post on the stator core and extending the start wire from the first post through the bore of the stator to commence the winding of the first coil.

12. The method of claim 11 further comprising keeping said first post from bending or breaking by extending a wire looping pin over said first post before looping said segment of the start wire around the first post.

13. The method of claim 11 further comprising the step of looping a segment of the finish wire about a second post on the stator core after winding the second coil.

14. The method of claim 13 further comprising keeping said second post from bending or breaking by extending a wire looping pin over said second post before looping said segment of the finish wire around the second post.

15. Stator winding apparatus for automatically winding coils of wire on the pole pieces of a two pole stator, said apparatus comprising:
   a reciprocating and oscillating winding spindle, said spindle having at least one wire exit needle;
   a reciprocatory and oscillatory drive assembly for reciprocating and oscillating said spindle to wind coils of wire about stator pole pieces, said drive mechanism including a motor driven main drive shaft, a motion transmission assembly for converting rotary motion of said main drive shaft into reciprocatory and oscillatory motion of said spindle, said motion transmission assembly including a drive gear rotated in response to rotation of a motor-driven main drive shaft, an intermediate pinion gear engaged with said drive gear, and a driven pinion connected by splines to the winding spindle;
   a rack and a gear shifting mechanism for moving said intermediate pinion gear into engagement with said rack after the winding of a coil on a first role piece; and
   an actuator for moving said rack to rotate said winding spindle to position said wire exit needle for winding a coil on a second pole piece.

16. The apparatus of claim 15 further comprising a lead pull mechanism for inserting a start wire extending to the first wound coil into a terminal member on the stator core and for inserting a finish wire extending from the second wound coil into a terminal member on the stator core.

17. The apparatus of claim 16 wherein said lead pull mechanism includes a wire gripper for gripping the coil lead wires at the end of the winding of one stator and the beginning of the winding of the next stator.

18. The apparatus of claim 17 wherein said lead pull mechanism further includes at least one vertically and horizontally movable wire guiding member for engaging wire segments between the wire exit needle and the stator core and moving portions of said wire as required by a lead terminating procedure.

19. The apparatus of claim 16 further comprising actuator driven lead stuffing members that engage the start and finish wires to force them into their respective terminal members.

20. The apparatus of claim 15 wherein a cross-over wire extends through the bore of the stator as a result of the rotation of the winding spindle caused by movement of said rack and the apparatus further comprises a cross-over wire retaining member that traps the cross-over wire toward a side of the stator bore so that the cross-over wire does not interfere with the winding of the coil on the second pole piece.

21. The apparatus of claim 20 wherein said cross-over wire retaining member includes a pair of retaining fingers, an actuator for extending said fingers into the bore of the stator, and an actuator for moving said fingers into engagement with the cross-over wire.

22. A method of automatically winding coils of wire on the pole pieces of a stator with the use of a stator winding machine having a reciprocating and oscillating winding spindle having at least one wire exit needle, which method comprises the steps of:
   winding a coil of wire around a pole piece by repeatedly reciprocating and oscillating said winding spindle;
   at the beginning of the winding of the coil, engaging a segment of wire leading from the stator core to the winding spindle by a wire guiding pin, moving the wire guiding pin to carry part of the segment of wire to a position past a post projecting from the stator core, and looping the wire around the post by movements of said winding spindle.

23. The method of claim 22 further comprising keeping said post from bending or breaking by extending a wire looping pin over said post before looping said segment of the start wire around the post.

24. The method of claim 22 further comprising the step of looping a segment of a coil finish wire about a second post on the stator core.

25. The method of claim 24 further comprising keeping said second post from bending or breaking by extending a wire looping pin over said second post before looping said segment of the finish wire around the second post.

26. Stator winding apparatus for automatically winding coils of wire on the pole pieces of a two pole stator, said apparatus comprising:
   a reciprocating and oscillating winding spindle, said spindle having at least one wire exit needle;
   a lead pull mechanism for inserting a coil start wire in a terminal member on the stator core and for inserting a finish wire into another terminal member on the stator core, said lead pull mechanism including a wire gripper for gripping the coil lead wires at the end of the winding of one stator and the beginning of the winding of a second stator and further including at least one vertically and horizontally movable wire guiding member for engaging wire segments between the wire exit needle and the stator core and moving portions of said wire as required by a lead terminating procedure.

27. The apparatus of claim 26 wherein said lead terminating apparatus further comprises actuator driven lead stuffing members that engage the start and finish wires to force them into their respective terminal members.

28. Stator winding apparatus for automatically and continuously winding a first coil of wire on a first pole piece of a two pole stator and winding a second coil of wire on a second pole piece form the same strand of wire from which the first coil is wound, said apparatus comprising:
   a reciprocating and oscillating winding spindle, said spindle having at least one wire exit needle, and said spindle being rotatable about its axis through 180° between the winding of one coil about the first pole piece and the second coil on the second pole piece, whereupon a cross-over wire is extended through the bore of the stator; and a cross-over wire retaining member that traps the cross-over wire toward a side of the stator bore so that the cross-over wire does not interfere with the winding of the second coil.

29. The apparatus of claim 28 wherein said cross-over wire retaining member includes a pair of retaining fingers, an actuator for extending said fingers into the bore of the stator, and an actuator for moving said fingers into engagement with the cross-over wire.

30. Stator winding apparatus for automatically winding coils of wire on the pole pieces of a two pole stator, said apparatus comprising:

a reciprocating and oscillating winding spindle, said spindle having at least one wire exit needle;

a reciprocatory and oscillatory drive assembly for reciprocating and oscillating said spindle to wind coils of wire about stator pole pieces, said drive mechanism including a motor driven main drive shaft, a motion transmission assembly for converting rotary motion of said main drive shaft into reciprocatory and oscillatory motion of said spindle for winding a coil of wire about a first pole piece, and a spindle rotating mechanism for rotating said spindle to reposition said spindle adjacent a second pole piece, in preparation for winding a coil of wire about said second pole piece.

31. The apparatus of claim 30 wherein said spindle rotating mechanism rotates said spindle through 180° increments upon each operation of said reciprocatory and oscillatory drive assembly.

* * * * *